(12) United States Patent
Ohnishi et al.

(10) Patent No.: US 8,584,790 B2
(45) Date of Patent: Nov. 19, 2013

(54) POWER STEERING APPARATUS

(75) Inventors: Teruyuki Ohnishi, Atsugi (JP); Hajime Komuro, Atsugi (JP); Kohtaro Shiino, Isehara (JP)

(73) Assignee: Hitachi Automotive Systems Steering, Ltd, Hiki-gun (JP)

( * ) Notice: Subject to any disclaimer, the term of this patent is extended or adjusted under 35 U.S.C. 154(b) by 203 days.

(21) Appl. No.: 13/086,926

(22) Filed: Apr. 14, 2011

(65) Prior Publication Data
US 2012/0073897 A1    Mar. 29, 2012

(30) Foreign Application Priority Data

Sep. 24, 2010 (JP) ................. 2010-213083

(51) Int. Cl.
*B62D 5/04* (2006.01)
(52) U.S. Cl.
USPC .......................................... 180/422; 180/446
(58) Field of Classification Search
USPC .................... 180/443, 444, 446, 421, 422
See application file for complete search history.

(56) References Cited

U.S. PATENT DOCUMENTS

| | | | | |
|---|---|---|---|---|
| 4,874,053 A | * | 10/1989 | Kimura et al. ................ | 180/443 |
| 6,729,433 B2 | * | 5/2004 | Uryu et al. .................... | 180/444 |
| 2004/0060766 A1 | * | 4/2004 | Hayakawa et al. ........... | 180/444 |
| 2005/0178608 A1 | * | 8/2005 | Shiino et al. .................. | 180/444 |
| 2007/0089927 A1 | * | 4/2007 | Kim et al. ..................... | 180/444 |
| 2007/0246289 A1 | * | 10/2007 | Tominaga ..................... | 180/444 |

FOREIGN PATENT DOCUMENTS

JP     2009-298246 A    12/2009

* cited by examiner

*Primary Examiner* — Anne Marie M Boehler
(74) *Attorney, Agent, or Firm* — Foley & Lardner LLP

(57) ABSTRACT

A power steering apparatus including a steering shaft, a sensor coil disposed on an outer circumferential side of the steering shaft and detecting a change in impedance value to determine an amount of relative rotation of an input shaft and an output shaft of the steering shaft, a steering housing including a first housing and a second housing, a sensor substrate disposed on the first housing, a neutral point regulating circuit on the sensor substrate which includes a resistor connected to the sensor coil and variably regulates a resistance value of the resistor so as to regulate the impedance value at a neutral point at which the amount of relative rotation of the input shaft and the output shaft is zero, and an electric motor which is driven and controlled in accordance with an output signal of the sensor coil regulated by the neutral point regulating circuit.

15 Claims, 8 Drawing Sheets

POWER STEERING APPARATUS

BACKGROUND OF THE INVENTION

The present invention relates to a power steering apparatus.

Conventionally, there has been proposed a power steering apparatus which assists steering effort of an operator of an automobile. Japanese Patent Application Unexamined Publication No. 2009-298246 discloses a power steering apparatus having a sensor which includes a sensor coil for detecting a rotational amount of a steering shaft and a substrate connected to the sensor coil. The substrate is assembled to a sensor housing through an opening which is formed in the sensor housing so as to open to an outer circumferential surface of the sensor housing. Therefore, an operation of regulating the sensor can be carried out through the opening.

SUMMARY OF THE INVENTION

However, in the power steering apparatus of the above-described conventional art, it is necessary to close the opening by a lid or the like. Therefore, there is a problem that the construction of the power steering apparatus becomes complicated.

It is an object of the present invention to provide a power steering apparatus having a more simplified construction.

In a first aspect of the present invention, there is provided a power steering apparatus including:

a steering shaft including an input shaft to which a rotational force is to be transmitted from a steering wheel, and an output shaft which is connected to the input shaft through a torsion bar and adapted to transmit the rotational force to steerable road wheels;

a sensor coil which is disposed on an outer circumferential side of the steering shaft and detects a change in impedance value to determine an amount of relative rotation of the input shaft and the output shaft;

a steering housing including a first housing surrounding the sensor coil and a second housing connected with the first housing, the first housing and the second housing being connected with each other in such a state that a first opening formed in the first housing and a second opening formed in the second housing are opposed to each other, the steering housing accommodating the steering shaft so as to extend through the first opening and the second opening, a sensor substrate which is disposed on the first housing and arranged closer to the first opening than the sensor coil so as to be exposed to the first opening;

a neutral point regulating circuit which is disposed on the sensor substrate and includes a resistor connected to the sensor coil, the neutral point regulating circuit being capable of variably regulating a resistance value of the resistor so as to regulate the impedance value at a neutral point at which the amount of relative rotation of the input shaft and the output shaft is zero, and an electric motor which is driven and controlled to provide the steerable road wheels with a steering assist force in accordance with an output signal of the sensor coil which is regulated by the neutral point regulating circuit.

In a second aspect of the present invention, there is provided the power steering apparatus according to the first aspect, further including a magnetic path resistance varying member which is disposed on the steering shaft and configured to vary a magnetic path resistance in the magnetic field which is generated by the sensor coil in accordance with a change in amount of relative rotation of the input shaft and the output shaft, wherein the sensor coil detects the change in impedance value which varies in accordance with a variation in magnetic path resistance to determine the amount of relative rotation of the input shaft the output shaft, and the neutral point regulating circuit regulates the resistance value of the resistor in a state in which the sensor coil and the magnetic path resistance varying member are assembled to the first housing.

In a third aspect of the present invention, there is provided the power steering apparatus according to the second aspect, wherein the neutral point regulating circuit regulates the resistance value of the resistor so as to regulate the impedance value which varies in accordance with a change in amount of relative rotation of the input shaft and the output shaft in a state in which the output shaft is assembled to the input shaft through the torsion bar.

In a fourth aspect of the present invention, there is provided the power steering apparatus according to the first aspect, further including a reduction gear which is disposed between the output shaft and the electric motor and transmits a rotational force of the electric motor to the output shaft, and a bearing which is disposed between the sensor substrate and the reduction gear and supports the output shaft so as to be rotatable relative to the steering housing.

In a fifth aspect of the present invention, there is provided the power steering apparatus according to the fourth aspect, wherein the first housing is made of a resin material, the second housing is made of a metal material, and the bearing is held on a bearing holder portion formed in the second housing and supports the output shaft so as to be rotatable.

In a sixth aspect of the present invention, there is provided the power steering apparatus according to the fifth aspect, wherein the neutral point regulating circuit includes a connection point to be connected with an external regulating device which regulates the resistance value of the resistor, and the connection point is disposed to be radially outwardly spaced from the bearing.

In a seventh aspect of the present invention, there is provided the power steering apparatus according to the first aspect, wherein the sensor substrate is arranged to form a right angle between the sensor substrate and the steering shaft.

In an eighth aspect of the present invention, there is provided the power steering apparatus according to the seventh aspect, wherein the neutral point regulating circuit includes a connection point to be connected with an external regulating device which regulates the resistance value of the resistor, and the connection point is disposed on a surface of the sensor substrate on a side of the output shaft.

In a ninth aspect of the present invention, there is provided the power steering apparatus according to the eighth aspect, wherein the external regulating device includes a portion to be connected with the connection point of the neutral point regulating circuit, the portion being biased toward the connection point in an axial direction of the steering shaft.

In a tenth aspect of the present invention, there is provided the power steering apparatus according to the first aspect, wherein the first housing is made of a resin material.

In an eleventh aspect of the present invention, there is provided the power steering apparatus according to the tenth aspect, further including a connector mounting portion molded simultaneously and integrally with the first housing, a connector which is disposed on the connector mounting portion and serves as a connection terminal to be connected with external electronic devices to be mounted to an automobile, and an electric wiring which connects the connector and the sensor substrate with each other.

In a twelfth aspect of the present invention, there is provided the power steering apparatus according to the tenth aspect, wherein the sensor substrate is formed with at least one through-hole, and the first housing is made of a thermoplastic resin and includes at least one caulking fixing portion which is made of the thermoplastic resin and integrally formed with the first housing, the caulking fixing portion extending through the through-hole from one side of the through-hole to the other side of the through-hole to allow a tip end portion thereof to project from the other side of the through-hole, the tip end portion being melted and deformed such that the tip end portion has an outer diameter larger than a diameter of the through-hole and then cooled and solidified to thereby fix the sensor substrate to the first housing through the caulking fixing portion.

In a thirteenth aspect of the present invention, there is provided the power steering apparatus according to the tenth aspect, wherein the sensor substrate is formed into an annular shape having a through-hole through which the steering shaft extends.

In a fourteenth aspect of the present invention, there is provided the power steering apparatus according to the first aspect, wherein the neutral point regulating circuit includes a connection point to be connected with an external regulating device which regulates the resistance value of the resistor, the connection point is disposed on a surface of the sensor substrate, and the surface of the sensor substrate except for a portion occupied by the connection point is covered with a resin coat.

In a fifteenth aspect of the present invention, there is provided a power steering apparatus including:

a steering shaft to which a rotational force is to be transmitted from a steering wheel;

a sensor coil which is disposed on an outer circumferential side of the steering shaft and detects a change in impedance value to determine an amount of rotation of the steering shaft;

a steering housing including a first housing surrounding the sensor coil and a second housing connected with the first housing, the first housing and the second housing being connected with each other in such a state that a first opening formed in the first housing and a second opening formed in the second housing are opposed to each other, the steering housing accommodating the steering shaft so as to extend through the first opening and the second opening, a sensor substrate which is disposed on the first housing and arranged closer to the first opening than the sensor coil so as to be exposed to the first opening;

a neutral point regulating circuit which is disposed on the sensor substrate and includes a resistor connected to the sensor coil, the neutral point regulating circuit being capable of variably regulating a resistance value of the resistor so as to regulate the impedance value at a neutral point at which an amount of clockwise and counterclockwise rotation of the steering shaft is zero, and an electric motor which is driven and controlled to provide steerable road wheels with a steering assist force in accordance with an output signal of the sensor coil which is regulated by the neutral point regulating circuit.

In a sixteenth aspect of the present invention, there is provided a method of regulating a neutral point of a torque sensor in a power steering apparatus, the power steering apparatus including:

a steering shaft including an input shaft to which a rotational force is to be transmitted from a steering wheel, and an output shaft which is connected to the input shaft through a torsion bar and adapted to transmit the rotational force to steerable road wheels;

a sensor coil which is disposed on an outer circumferential side of the steering shaft and detects a change in impedance value to determine an amount of relative rotation of the input shaft and the output shaft;

a steering housing including a first housing surrounding the sensor coil and a second housing connected with the first housing, the first housing and the second housing being connected with each other in such a state that a first opening formed in the first housing and a second opening formed in the second housing are opposed to each other, the steering housing accommodating the steering shaft so as to extend through the first opening and the second opening, a sensor substrate which is disposed on the first housing and arranged closer to the first opening than the sensor coil so as to be exposed to the first opening;

a neutral point regulating circuit which is disposed on the sensor substrate and includes a resistor connected to the sensor coil, and an electric motor which is driven and controlled to provide the steerable road wheels with a steering assist force in accordance with an output signal of the sensor coil which is regulated by the neutral point regulating circuit;

the method including:

a first step of connecting a regulating device which regulates the resistance value of the resistor with the neutral point regulating circuit in a state in which the first opening is not closed by the second housing, a second step of regulating the resistance value of the resistor by the regulating device; and a third step of connecting the first housing and the second housing with each other so as to close the first opening.

In a seventeenth aspect of the present invention, there is provided the method according to the sixteenth aspect, wherein the power steering apparatus further includes a magnetic path resistance varying member which is disposed on the steering shaft and configured to vary a magnetic path resistance in the magnetic field which is generated by the sensor coil in accordance with a change in amount of relative rotation of the input shaft and the output shaft, the sensor coil detects the change in impedance value which varies in accordance with a variation in magnetic path resistance to determine the amount of relative rotation of the input shaft and the output shaft, and the first step and the second step are carried out in a state in which the magnetic path resistance varying member is assembled to the steering shaft.

In an eighteenth aspect of the present invention, there is provided the method according to the seventeenth aspect, wherein the first step and the second step are carried out so as to regulate the impedance value which varies in accordance with the change in amount of relative rotation of the input shaft and the output shaft in a state in which the output shaft is connected to the input shaft through the torsion bar.

In a nineteenth aspect of the present invention, there is provided the method according to the sixteenth aspect, wherein the neutral point regulating circuit includes a connection point to be connected with the regulating device, and the regulating device includes a portion to be connected with the connection point, the portion of the regulating device being biased toward the connection point in an axial direction of the steering shaft.

In a twentieth aspect of the present invention, there is provided the method according to the sixteenth aspect, wherein the sensor substrate is formed with at least one through-hole, and the first housing is made of a thermoplastic resin and includes at least one caulking fixing portion which is made of the thermoplastic resin and integrally formed with the first housing, the method further including a step of fixing the sensor substrate to the first housing, the fixing step including:

a step of allowing the caulking fixing portion to extend through the through-hole of the sensor substrate from one side of the through-hole to the other side of the through-hole such that a tip end portion of the caulking fixing portion is projected from the other side of the through-hole;

a step of melting and deforming the projected tip end portion of the caulking fixing portion such that the projected tip end portion has an outer diameter larger than a diameter of the through-hole, and a step of cooling and solidifying the melted and deformed tip end portion of caulking fixing portion.

The other objects and features of this invention will become understood from the following description with reference to the accompanying drawings.

DETAILED DESCRIPTION OF THE INVENTION

A power steering apparatus according to respective embodiments of the present invention will be explained hereinafter with reference to the accompanying drawings.

First Embodiment

[Construction]

Figure 1:
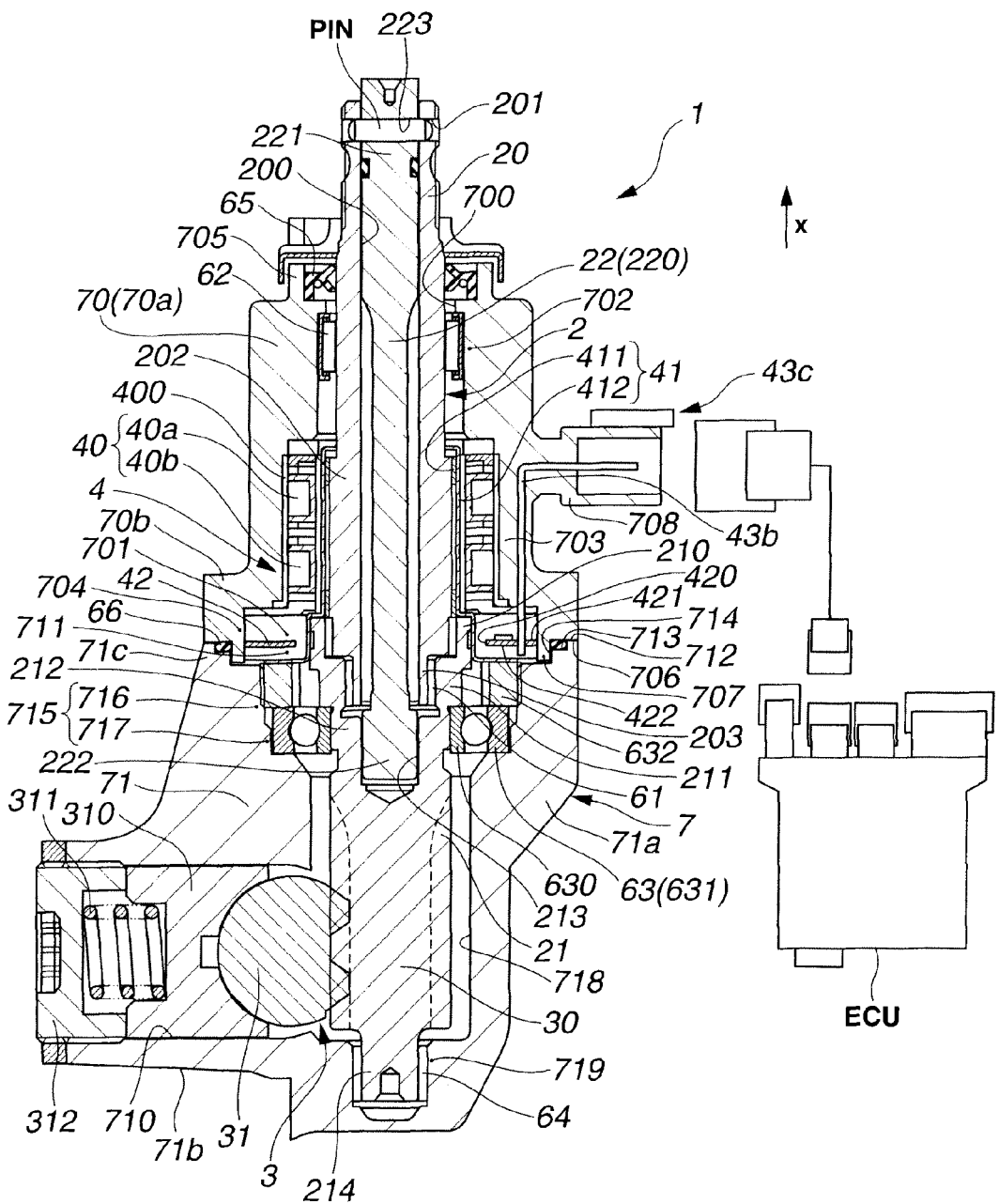
FIG. 1 is a cross section of a power steering apparatus according to a first embodiment of the present invention, taken in an axial direction of the power steering apparatus.

Referring to FIG. 1 to FIG. 6 and FIG. 12, the power steering apparatus according to a first embodiment of the present invention is explained. The power steering apparatus according to the first embodiment is useable in an automobile and acts as a steering effort assisting apparatus which assists a steering effort of an operator of the automobile. FIG. 1 is a cross section of power steering apparatus 1 (hereinafter referred to merely as apparatus 1) in an axial direction of apparatus 1 (that is, a cross section taken by a plane in which an axis of steering shaft 2 lies). As shown in FIG. 1, apparatus 1 includes steering shaft 2, rack-and-pinion mechanism 3 connected to steering shaft 2, sensor 4 as a steering state detector which detects a steering state given by the operator, electric motor 5 as a drive source which generates a steering assist force to assist the operator's steering effort, and electronic control unit ECU as a steering assist force controller which drives and controls electric motor 5 on the basis of detection signal outputted from sensor 4. Steering shaft 2 includes input shaft 20 and output shaft 21. Input shaft 20 is connected to a steering wheel (i.e., a steering effort input member) to which the operator's steering effort as a torque is applied. Output shaft 21 is connected to input shaft 20 through torsion bar 22 and connected to steerable road wheels through rack-and-pinion mechanism 3, thereby transmitting the torque to the steerable road wheels. Rack-and-pinion mechanism 3 is a reduction gear (a reduction gear mechanism) which increases and converts the torque to a steering force to be transmitted to the steerable road wheels.

In this embodiment, sensor 4 is a torque sensor which detects a steering torque inputted by the operator to determine an amount of rotation of steering shaft 2, specifically, an amount of relative rotation of input shaft 20 and output shaft 21 (i.e., an amount of relative rotational displacement or an amount of torsion). Sensor 4 includes sensor coil 40, magnetic path resistance varying member 41 and sensor substrate 42. Sensor 4 is not limited to the torque sensor in this embodiment and may be a steering angle sensor. That is, apparatus 1 determines an amount of steering assist on the basis of the steering torque detected by the torque sensor, but apparatus 1 may determine an amount of steering assist on the basis of the steering angle detected by the steering angle sensor. Electric motor 5 is driven and controlled on the basis of the output signal of sensor 4 and provides the steerable road wheels with the steering assist force. Electric motor 5 may be a brushless motor.

Figure 12:
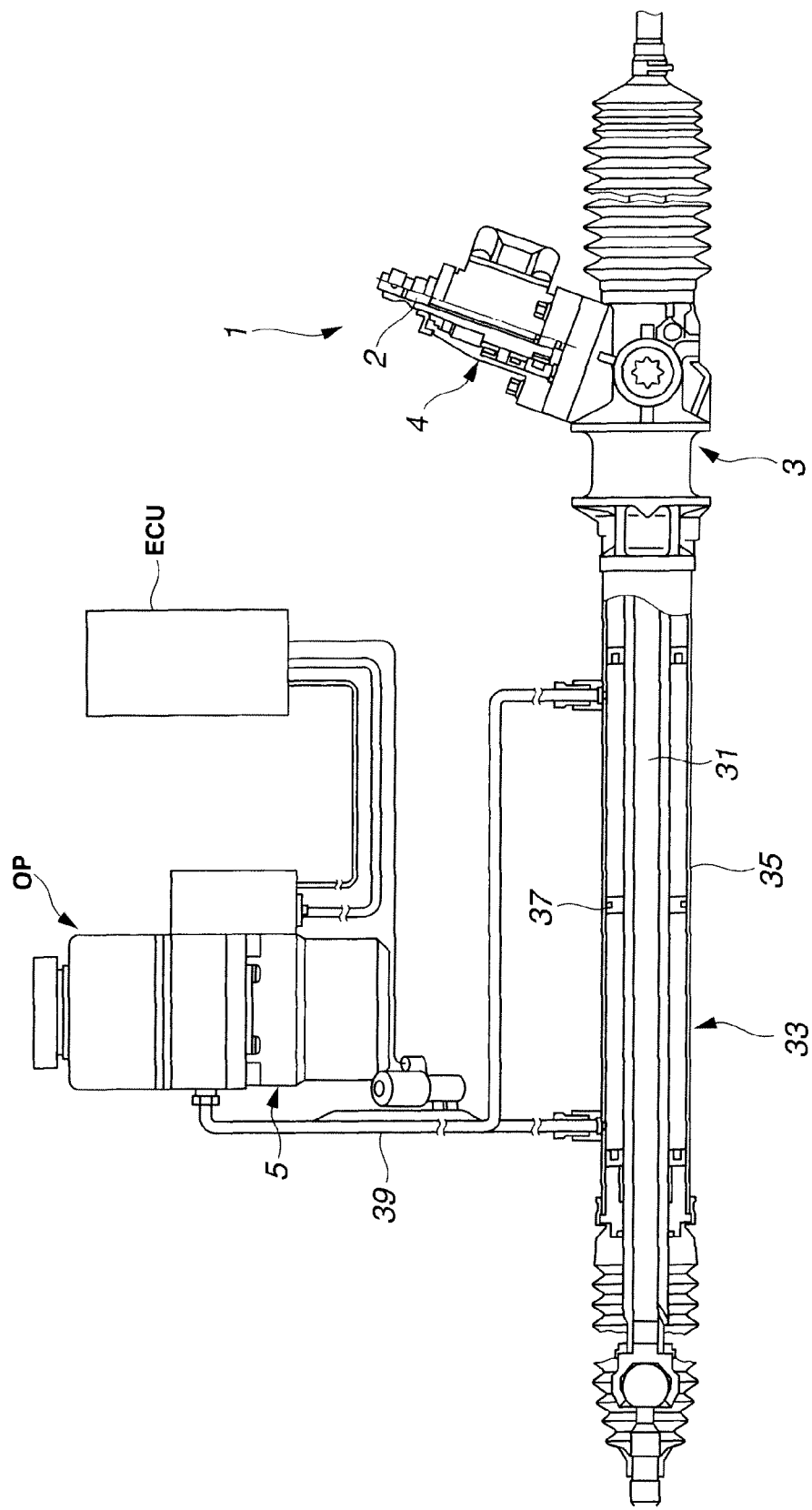
FIG. 12 is a schematic diagram showing the power steering apparatus according to the first embodiment of the present invention.

As shown in FIG. 12, apparatus 1 includes power cylinder 33 connected to rack-and-pinion mechanism 3, and oil pump OP which supplies a hydraulic pressure to power cylinder 33 and discharges the hydraulic pressure from power cylinder 33 via a pair of pipes 39. Power cylinder 33 includes cylinder tube 35 accommodating rack shaft 31 which is connected to rack-and-pinion mechanism 3. Annular piston 37 is mounted to rack shaft 31 and slidably moveable within cylinder tube 35. Oil pump OP is a reversible oil pump which is driven by electric motor 5 to produce a hydraulic force serving as an assist force. Apparatus 1 is not limited to the so-called electro-hydraulic type used in this embodiment and may be a so-called direct drive type in which an electric motor directly drives a steering gear to produce an assist force. In the case of the apparatus of the rack assist type, a reduction gear (a reduction gear mechanism) is disposed between electric motor 5 and rack shaft 31. The reduction gear converts and increases the rotational force of electric motor 5 and then transmits the increased rotational force to rack shaft 31.

(Steering Shaft)

In the following description, an axial direction of steering shaft 2 is denoted by axis X and the side of the steering wheel is referred to as a positive direction of axis X. Input shaft 20 has through-hole 200 extending through input shaft 20 in the direction of axis X. Input shaft 20 has pin insertion hole 201 at one end portion thereof which is located on the side of the positive direction of axis X. Through-hole 201 extends in a radial direction of input shaft 20, into which pin PIN is inserted. Disposed at a middle portion of input shaft 20 in the axial direction is inner ring holder portion 202 which has an outer diameter slightly larger that that of other portions. Supported portion 203 having an outer diameter smaller than the middle portion is disposed at the other end portion of input shaft 20 which is located on the side of a negative direction of axis X. Supported portion 203 is rotatably supported by needle bearing 61 as explained later.

Output shaft 21 has one end portion in the positive direction of axis X in which outer ring holder portion 210, first bearing holder portion 211 and first supported portion 212 are successively disposed in this order toward the side of the negative direction of axis X. Outer ring holder portion 210 is a cylindrical portion having an inner diameter larger than the outer diameter of the other end portion of input shaft 20 except for supported portion 203 which is located on the side of the negative direction of axis X. First bearing holder portion 211 is a cylindrical portion which has an outer diameter smaller than the outer diameter of outer ring holder portion 210 and has an inner diameter larger than the outer diameter of supported portion 203 of input shaft 20. Needle bearing (needle roller bearing) 61 as a first bearing is disposed and held on an inner circumferential side of first bearing holder portion 211. First supported portion 212 is a cylindrical portion which has an outer diameter smaller than the outer diameter of first bearing holder portion 211 and has fitting hole 213 on a radial inside thereof. Fitting hole 213 extends from a radial inside portion of a bottom surface of first bearing holder portion 211 in the negative direction of axis X over a predetermined depth and has a diameter smaller than an inner diameter of needle bearing 61. Output shaft 21 has a portion located on the side of the negative direction of axis X which is formed with teeth on an outer circumferential surface thereof and constitutes pinion shaft 30 of rack-and-pinion mechanism 3. In other words, output shaft 21 and pinion shaft 30 are connected to each other to form a united body. Disposed on the other end portion of output shaft 21 in the negative direction of axis X is second supported portion 214 which has an outer diameter smaller than other portions of output shaft 21.

Torsion bar 22 extends through through-hole 200 of input shaft 20. Torsion bar 22 has one end portion 221 which is located on the side of the positive direction of axis X. One end portion 221 has substantially the same diameter as a diameter of through-hole 200 and has pin insertion hole 223 which penetrates one end portion 221 in a radial direction of torsion bar 22. Pin PIN extends through pin insertion holes 201 and 223, by which torsion bar 22 is fixed to one end portion 221 of input shaft 20. Torsion bar 22 has major portion 220 having a relatively small diameter. The other end portion 222 of torsion bar 22 projects from through-hole 200 of input shaft 20 into fitting hole 213 of output shaft 21 and is fitted to fitting hole 213 through serrations. Torsion bar 22 is thus connected to output shaft 21 through serration fitting. Rack shaft 31 has teeth meshing with the teeth of pinion shaft 30 and thus cooperate with pinion shaft 30 to form rack-and-pinion mechanism 3. The gear mechanism is not limited to rack-and-pinion mechanism 3 and may be other mechanisms, for instance, a variable gear ratio mechanism.

(Housing)

Figure 2:
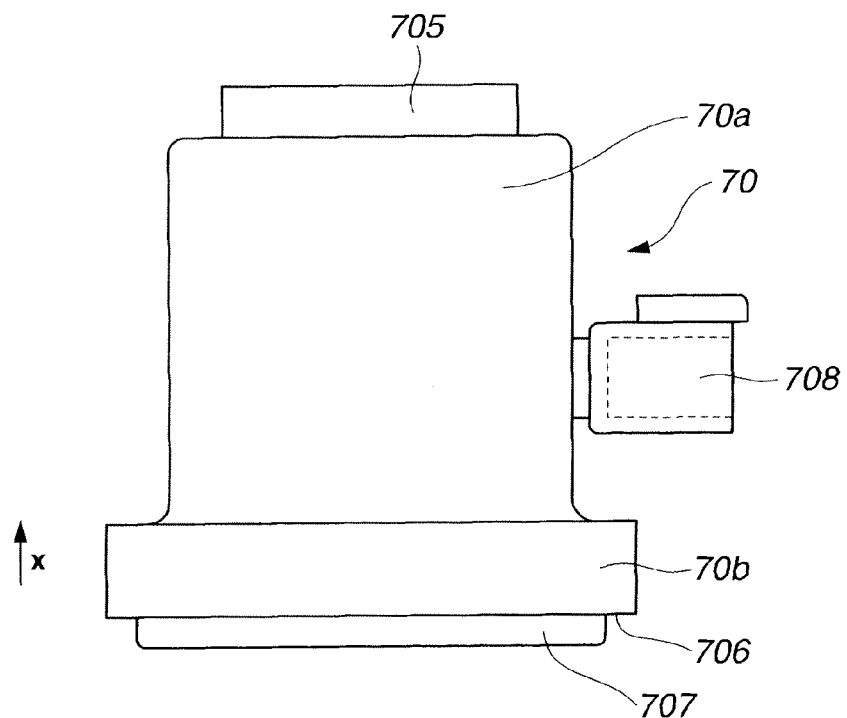
FIG. 2 is a side view of a sensor housing of the power steering apparatus as shown in FIG. 1.

Apparatus 1 includes steering housing 7 as a housing member which accommodates parts such as steering shaft 2. Steering housing 7 includes sensor housing 70 as a first housing and gear housing 71 as a second housing. Sensor housing 70 accommodates input shaft 20 and sensor 4. Gear housing 71 accommodates output shaft 21 (pinion shaft 30) and rack-and-pinion mechanism 3. Sensor housing 70 and gear housing 71 are coupled with each other to form steering housing 7. Sensor housing 70 is made of a resin material and includes generally cylindrical main body 70a extending in the direction of axis X, and flanged connecting portion 70b which extends from main body 70a in the negative direction of axis X and is integrally formed with main body 70a. Flanged connecting portion 70b has an outer diameter larger than that of main body 70a and is connected with gear housing 71. FIG. 2 is a side view of sensor housing 70 when viewed from a radial direction thereof. Sensor housing 70 includes connector mounting portion 708 integrally formed with sensor housing 70. Connector mounting portion 708 is die-molded simultaneously and integrally with sensor housing 70.

As shown in FIG. 1, main body 70a of sensor housing 70 has an open end which is located on the side of the positive direction of axis X. Input shaft 20 disposed in sensor housing 70 projects from opening 700 at the open end of main body 70a toward the side of the positive direction of axis X. Flanged connecting portion 70b has an open end which is located on the side of the negative direction of axis X. Input shaft 20 projects from opening (a first opening) 701 in the negative direction of axis X. Sensor hosing 70 includes second bearing holder portion 702, coil holder portion 703 and substrate holder portion 704 which are disposed inside (on an inner circumferential side) of sensor hosing 70 in this order toward the side of the negative direction of axis X. Second bearing holder portion 702 is disposed near opening 700 of main body 70a and formed into a generally cylindrical shape having a relatively small diameter. Needle bearing 62 as a second bearing is disposed and held on an inner circumferential side of second bearing holder portion 702. A portion of input shaft 20 which is disposed between the one end portion of input shaft 20 and inner ring holder portion 202 is rotatably supported by needle bearing 62. Sensor hosing 70 further includes dust seal holder portion 705 which is disposed on the axis X positive direction side of second bearing holder portion 702. Dust seal 65 is held on dust seal holder portion 705 and closes opening 700 of main body 70a. Coil holder portion 703 is disposed on an inner circumferential side of sensor housing 70 (i.e., main body 70a and connecting portion 70b) and formed into a generally cylindrical shape having a diameter larger than second bearing holder portion 702. Sensor coil 40 (i.e., coil units 40a, 40b) of sensor 4 is disposed and held on an inner circumferential side of coil holder portion 703. Substrate holder portion 704 is disposed on the inner circumferential side of sensor hosing 70 (i.e., connecting portion 70b) and is formed into a generally cylindrical shape having a diameter larger than coil holder portion 703. Sensor substrate 42 of sensor 4 is disposed and held on an inner circumferential side of substrate holder portion 704. Connecting portion 70b has annular seal surface 706 and fitting projection 707 at an end portion thereof which is located on the side of the negative direction of axis X. Fitting projection 707 extends from an inner circumferential side of seal surface 706 in the negative direction of axis X and forms a generally cylindrical shape. Fitting projection 707 has an outer diameter smaller than that of a major portion of connecting portion 70*b* and substantially the same inner diameter as that of substrate holder portion 704. Fitting projection 707 constitutes a part of substrate holder portion 704. Sensor substrate 42 is disposed on the axis X negative direction side of seal surface 706 so as to be slightly spaced from seal surface 706, and held on an inner circumferential surface of fitting projection 707.

Figure 3:
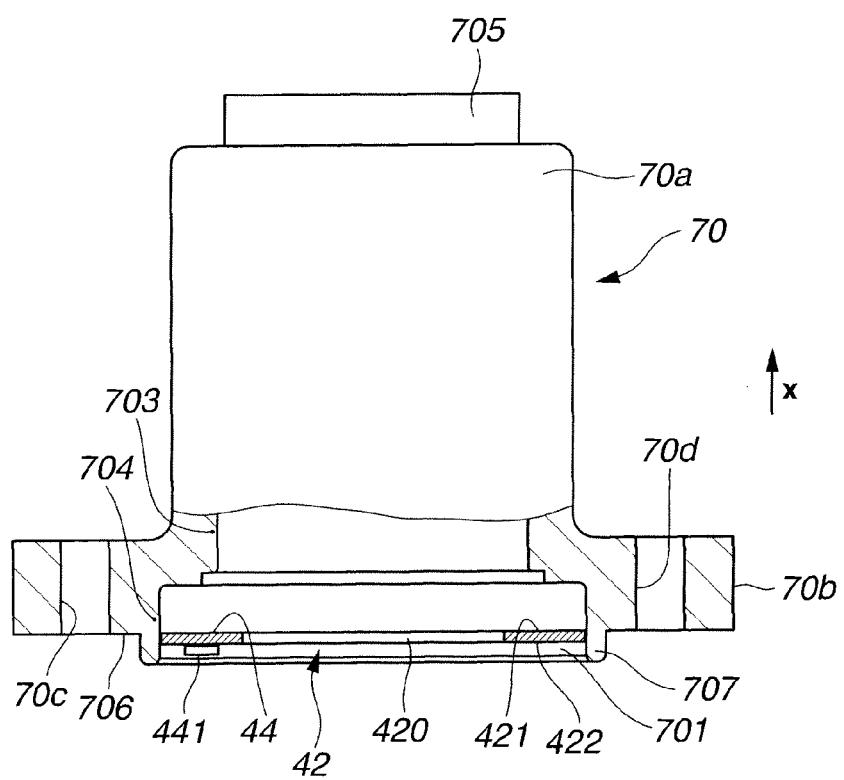
FIG. 3 is a partial cross section, taken along line I-I as shown in FIG. 4, of the sensor housing of the power steering apparatus according to the first embodiment to which a sensor substrate is assembled.
Figure 4:
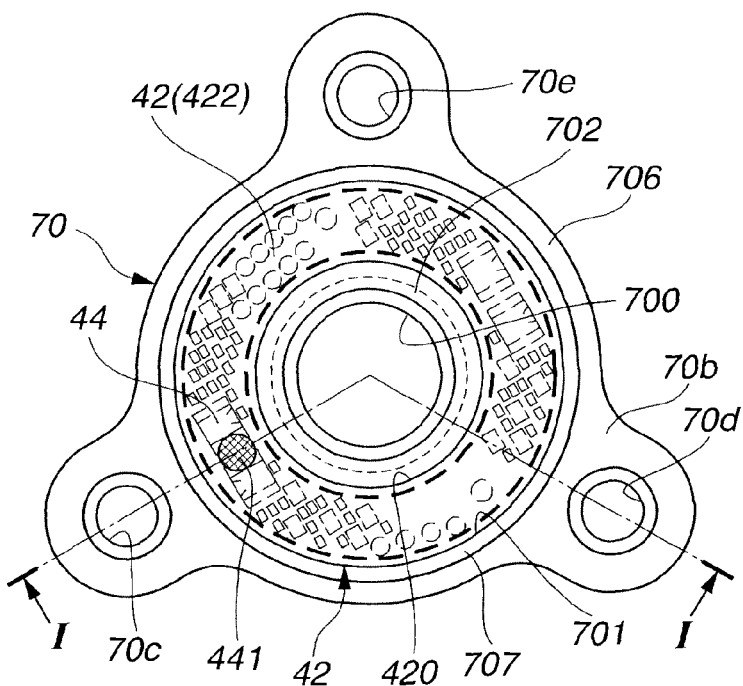
FIG. 4 is a plan view of the sensor housing as shown in FIG. 3 to which the sensor substrate is assembled, when viewed from the side of an opening of the sensor housing.

FIG. 3 is a side view of sensor housing 70 to which sensor substrate 42 is assembled, when viewed in the radial direction thereof, in which a portion near opening 701 is shown in cross section taken in the axial direction. FIG. 4 is a plan view of sensor housing 70 to which sensor substrate 42 is assembled, when viewed from the side of opening 701 (i.e., from the side of the negative direction of axis X). FIG. 3 is a cross section taken along line I-I as shown in FIG. 4. Connecting portion 70*b* has three bolt holes 70*c*, 70*d*, 70*e* disposed in a circumferential direction of connecting portion 70*b* at substantially equal intervals. Bolt holes 70*c*, 70*d*, 70*e* penetrate connecting portion 70*b* in the direction of axis X and serve for connecting gear housing 71 and sensor housing 70 through bolts.

As shown in FIG. 1, connector mounting portion 708 is provided with connector 43*c*. Connector 43*c* is a connection terminal to be connected with external electronic devices (i.e., ECU, battery) which are to be mounted in the automobile, via a cable. Sensor housing 70 further includes electric wiring 43*b* which connects sensor substrate 42 and connector 43*c*. Electric wiring 43*b* is provided by insert-molding simultaneously and integrally with sensor housing 70. Electric wiring 43*b* extends from the inside of sensor housing 70 (i.e., from an end surface of coil holder portion 703 on the side of the negative direction of axis X) toward first opening 701 and has one end serving as a terminal connected to sensor substrate 42. Electric wiring 43*b* also extends from the inside of sensor housing 70 toward the inner circumferential side of connector mounting portion 708 and has the other end serving as a terminal connected to a counterpart of connector 43*c* (i.e., a cable).

Gear housing 71 is made of a metal material and includes output shaft holder portion 71*a* which extends in the direction of axis X and has generally cylindrical shape having a closed end, and rack shaft holder portion 71*b* which is disposed on the axis X negative direction side of output shaft holder portion 71*a* and integrally formed with output shaft holder portion 71*a*. Output shaft holder portion 71*a* has opening (second opening) 711 opened to an end surface of output shaft holder portion 71*a* in the positive direction of axis X. Output shaft 21 projects from opening 711 in the positive direction of axis X. Disposed on an outer periphery of opening 711 is connecting portion 71*c* which is connected with sensor housing 70. Connecting portion 71*c* has annular mating surface 712 and generally cylindrical fitting recess 714 at an end portion thereof in the positive direction of axis X. Mating surface 712 is formed with seal groove 713 on an inner circumferential side thereof in which O-ring 66 as a seal member is disposed. Fitting recess 714 extends from an inner circumferential side of seal groove 713 in the negative direction of axis X and has an inner diameter slightly larger than an outer diameter of fitting projection 707 of sensor housing 70. Rack shaft holder portion 71*b* includes a rack shaft accommodating hole which extends in a direction substantially perpendicular to axis X and accommodates rack shaft 31, and guide accommodating hole 710 which extends through rack shaft holder portion 71*b* in a direction substantially perpendicular to axis X and the rack shaft accommodating hole and accommodates rack guide 310 and spring 311. One open end of guide accommodating hole 710 which is exposed to an outside is closed by lid 312 which serves as a retainer for spring 311.

Disposed on an inside (i.e., an inner circumferential side) of output shaft holder portion 71*a* are third bearing holder portion 715, output shaft accommodating hole 718 and fourth bearing holder portion 719 in this order toward the side of the negative direction of axis X. Third bearing holder portion 715 is disposed near the axis X positive direction side opening (i.e., second opening 711) of output shaft holder portion 71*a*. Third bearing holder portion 715 extends from a bottom surface of fitting recess 714 in the negative direction of axis X and forms a generally cylindrical shape having a relatively large diameter. Ball bearing 63 as a third bearing is disposed and held in third bearing holder portion 715 so as to be rotatably support output shaft 21 therein. Third bearing holder portion 715 includes larger diameter hole 716 formed on the side of the positive direction of axis X, and smaller diameter hole 717 formed on the side of the negative direction of axis X. Outer race 631 of ball bearing 63 is fitted to an inner circumferential surface of a portion of third bearing holder portion 715 which defines smaller diameter hole 717. Reference numeral 630 denotes an inner race of ball bearing 63. Retainer 632 for fixing outer race 631 in the direction of axis X is fitted to an inner circumferential surface of a portion of third bearing holder portion 715 which defines larger diameter hole 716. Output shaft accommodating hole 718 has a generally cylindrical shape having a diameter smaller than third bearing holder portion 715 (smaller diameter hole 717). Guide accommodating hole 710 has the other open end opened to a portion of output shaft accommodating hole 718 which is located on the side of the negative direction of axis X. The teeth of rack shaft 31 is exposed to the portion of output shaft accommodating hole 718 through the other open end of guide accommodating hole 710. Fourth bearing holder portion 719 has a generally cylindrical shape having a closed end and a diameter smaller than output shaft accommodating hole 718. Needle bearing 64 as a fourth bearing is disposed and held on an inner circumferential side of fourth bearing holder portion 719 so as to be rotatably support output shaft 21 therein.

(Assembled State)

Sensor housing 70 and gear housing 71 are connected to each other by arranging sensor housing 70 and gear housing 71 such that first opening 701 and second opening 711 are opposed to each other in the direction of axis X. Specifically, connecting portion 70*b* of sensor housing 70 and connecting portion 71*c* of gear housing 71 are connected to each other in an opposed relation such that fitting projection 707 of connecting portion 70*b* is fitted to fitting recess 714 of connecting portion 71*c*. At this time, seal surface 706 of connecting portion 70*b* abuts on O-ring 66 at connecting portion 71*c* and compresses O-ring 66 to thereby seal a clearance between connecting portions 70*b*, 71*c*. Thus, steering housing 7 is formed by sensor housing 70 and gear housing 71 connected to each other. Steering shaft 2 is accommodated inside steering housing 7 such that steering shaft 2 penetrates first opening 701 and second opening 711. The portion of steering shaft 2 on the side of the positive direction of axis X (i.e., the portion of input shaft 20 on the side of the positive direction of axis X) is rotatably supported in sensor housing 70 by needle bearing (the second bearing) 62. The middle portion of steering shaft 2 in the direction of axis X (i.e., the axis X positive direction side of output shaft 21) is rotatably supported by ball bearing (the third bearing) 63 which is held by third bearing holder portion 715 of gear housing 71. Ball bearing 63 is disposed between sensor substrate 42 and rack-and-pinion mechanism 3 and supports output shaft 21 so as to be rotatable relative to steering housing 7. The end portion of steering shaft 2 on the side of the negative direction of axis X (i.e., the portion of output shaft 21 on the side of the negative direction of axis X) is rotatably supported in gear housing 71 by needle bearing (the fourth bearing) 64. Rack shaft 31 is supported by rack guide 310 and pressed against pinion shaft 30 by spring 311.

(Sensor)

Sensor coil 40 is disposed between steering shaft 2 and coil holder portion 703 of sensor housing 70. Specifically, sensor coil 40 is arranged to surround an outer circumferential surface of steering shaft 2 (input shaft 20) and held by coil holder portion 703 so as to be enclosed therein. Sensor coil 40 includes two coil units 40a, 40b which are held on an inner circumferential side of cylindrical retainer 400 so as to form a united body. Retainer 400 with coil units 40a, 40b is press-fitted to an inner circumferential surface of coil holder portion 703 from the side of the negative direction of axis X. With this construction, it is possible to suppress occurrence of backlash and perform positioning of sensor coil 40 in the axial direction. Sensor coil 40 is constructed to generate a magnetic flux by being energized. Input shaft 20 is made of a magnetic material and forms a magnetic field by the magnetic flux which is generated by energized sensor coil 40.

Sensor 4 is a so-called magnetostriction type including magnetic path resistance varying member 41 which is disposed on steering shaft 2. Magnetic path resistance varying member 41 is configured to vary a magnetic path resistance in the magnetic field generated by energized sensor coil 40 in accordance with a change in amount of a relative rotation of input shaft 20 and output shaft 21. Specifically, magnetic path resistance varying member 41 is made of an electrically conductive and non-magnetic material such as alumina and includes inner ring 411 as a first cylindrical member and outer ring 412 as a second cylindrical member. Inner ring 411 and outer ring 412 have a plurality of windows (hollow portions) disposed in the direction of axis X, respectively. Inner ring 411 is fixed to inner ring holder portion 202 of input shaft 20 and allowed to make a unitary rotation with input shaft 20. Specifically, inner ring 411 is disposed between input shaft 20 and sensor coil 40 so as to be opposed to an outer circumferential surface of inner ring holder portion 202. Outer ring 412 is held on outer ring holder portion 210 of output shaft 21 and allowed to make a unitary rotation with output shaft 21. Specifically, outer ring 412 is disposed between input shaft 20 and sensor coil 40 such that an end portion of outer ring 412 located on the side of the negative direction of axis X is fixed to outer ring holder portion 210, an inner circumferential surface of outer ring 412 is opposed to an outer circumferential surface of inner ring 411 and an outer circumferential surface of a main portion of outer ring 412 is opposed to an inner circumferential surface of sensor coil 40.

Figure 6:
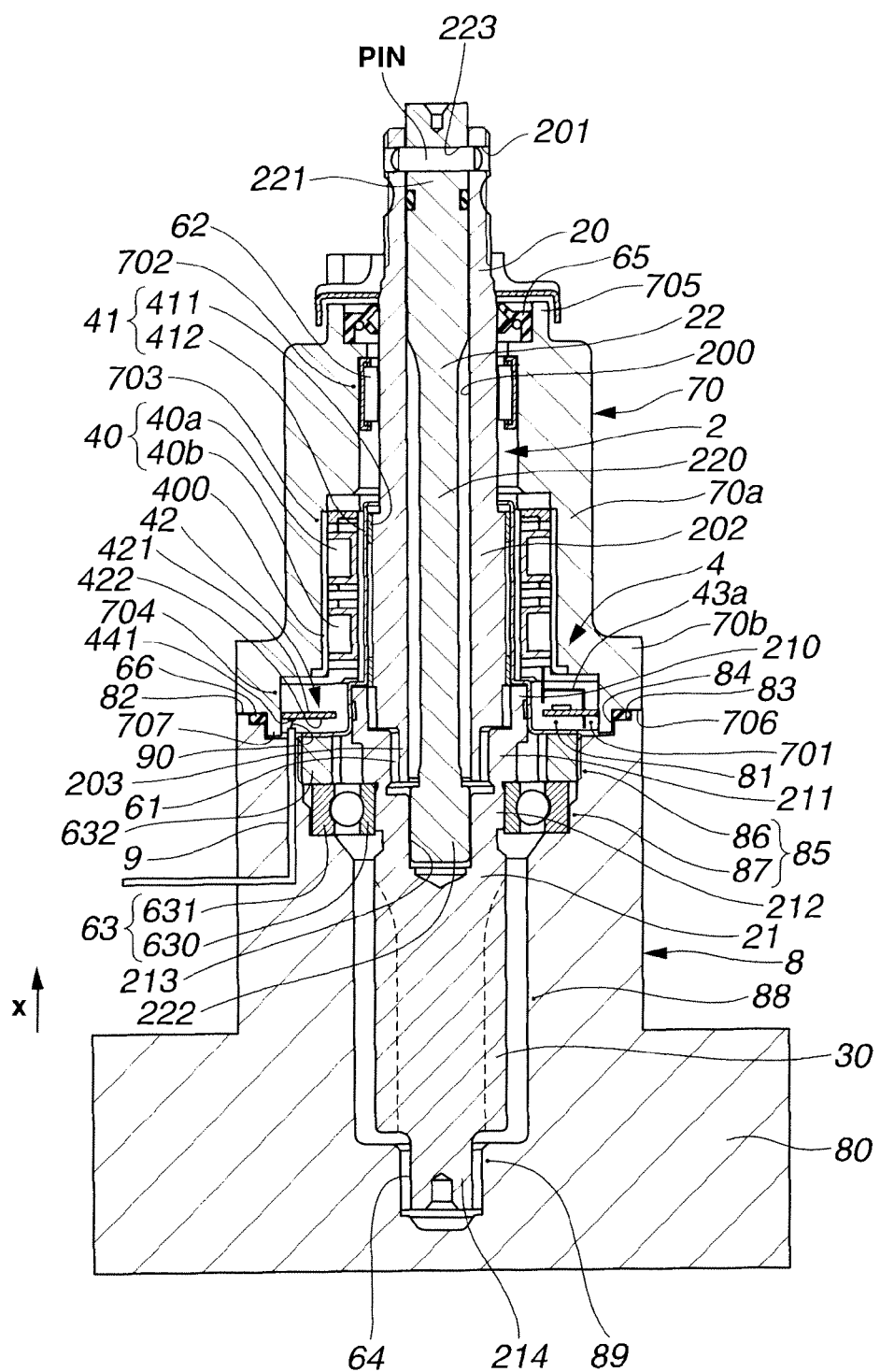
FIG. 6 is a cross section of the sensor housing of the power steering apparatus according to the first embodiment which is set on the regulating device shown in FIG. 5.

As shown in FIG. 4, sensor substrate 42 is formed into an annular (doughnut) shape in plan view having central through-hole 420 through which steering shaft 2 extends. Sensor substrate 42 is held on sensor housing 70 in such a state that an outer circumferential surface of sensor substrate 42 is fitted onto an inner circumferential surface of substrate holder portion 704 such that opposite surfaces of sensor substrate 42 (i.e., surface 421 on the side of the positive direction of axis X and surface 422 on the side of the negative direction of axis X) are substantially perpendicular to axis X (i.e., steering shaft 2). Sensor substrate 42 is disposed on the axis X negative direction side of sensor coil 40 (i.e., on the side of first opening 701), so that surface 422 on the side of the negative direction of axis X is exposed to first opening 701 of sensor housing 70. Sensor coil 40 and sensor substrate 42 are connected with each other through electric wiring 43a as shown in FIG. 6.

Sensor coil 40 is constructed to detect an electric signal (i.e., a change in impedance value) to determine an amount of rotation of steering shaft 2 in clockwise and counterclockwise directions (i.e., an amount of relative rotation of input shaft 20 and output shaft 21). Specifically, when a steering operation is carried out by the operator, torsion bar 22 fixed between input shaft 20 and output shaft 21 undergoes torsion so that a degree of overlapping of the windows of inner ring 411 and the windows of outer ring 412 is changed to thereby cause a variation in amount of a magnetic flux passing through the windows. The variation in amount of a magnetic flux appears as a change in impedance value. The change in impedance value caused in sensor coil 40 is inputted to sensor substrate 42 through electric wiring 43a. Sensor substrate 42 calculates an amount of a relative rotation of input shaft 20 and output shaft 21 (i.e., a steering torque) on the basis of the inputted change in impedance value. Thus, sensor coil 40 detects the change in impedance value which occurs in accordance with the variation in magnetic path resistance caused by magnetic path resistance varying member 41, and determines an amount of the relative rotation of input shaft 20 and output shaft 21.

The steering torque is calculated with reference to an impedance value at a neutral point of steering shaft 2. The neutral point means a state in which an amount of rotation of steering shaft 2 in clockwise and counterclockwise directions, that is, an amount of a relative rotation of input shaft 20 and output shaft 21, is a reference value or less (about 0). The impedance value at the neutral point is previously regulated by neutral point regulating circuit 44 upon production of apparatus 1. The steering torque calculated is inputted to ECU through electric wiring 43a and connector 43c. ECU calculates a steering assist torque which serves for reducing the steering effort for generating the steering torque on the basis of the input of the steering torque calculated. ECU then supplies electric motor 5 with a drive current which is necessary to generate the steering assist torque calculated. Electric motor 5 is driven and controlled so as to provide the steerable road wheels with a steering assist force in accordance with an output signal from sensor 4 (i.e., an output signal from sensor coil 40 regulated by neutral point regulating circuit 44).

Neutral point regulating circuit 44 is disposed on sensor substrate 42. Neutral point regulating circuit 44 includes a resistor (a variable resistor) which is capable of variably regulating a resistance value and connected to sensor coil 40. Neutral point regulating circuit 44 is capable of variably regulating a resistance value of the resistor so as to regulate (calibrate) the impedance value in sensor coil 40 at the neutral point. In this embodiment, an element capable of regulating a resistance value by applying an electric signal (i.e., voltage value) to the element is used as the resistor. As shown in FIG. 3 and FIG. 4, neutral point regulating circuit 44 includes connection point 441 as a terminal to which the electric signal for regulating a resistance value of the resistor is inputted. Connection point 441 is disposed on the axis X negative direction side surface 422 of sensor substrate 42. External regulating device 8 for regulating a resistance value of the resistor of neutral point regulating circuit 44 is connected to connection point 441.

Figure 5:
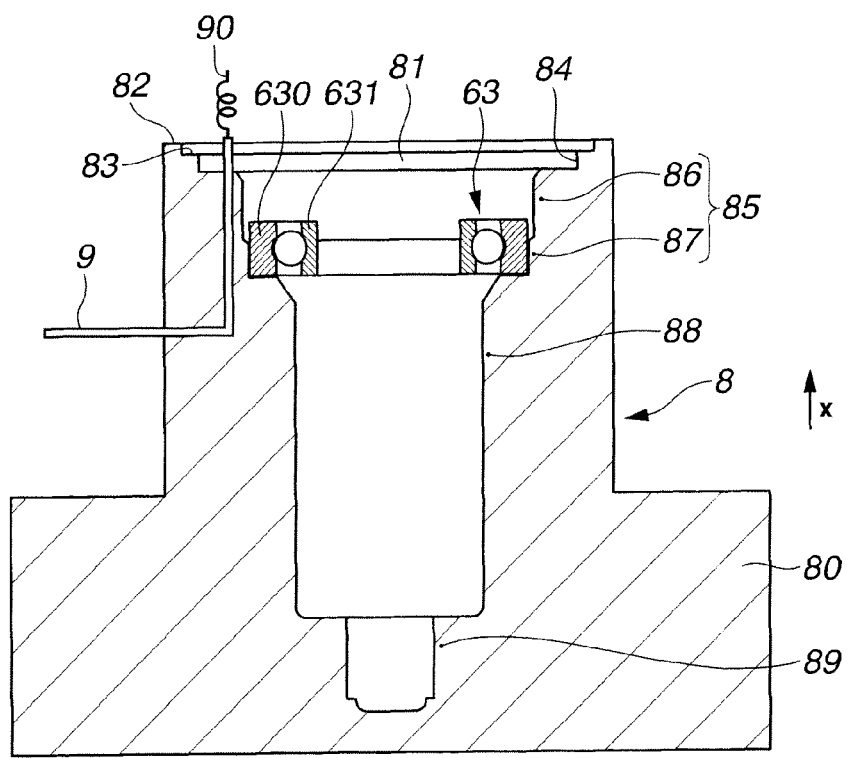
FIG. 5 is a cross section of an external regulating device for regulating a sensor, taken in an axial direction of the regulating device.

FIG. 5 shows a cross section of regulating device 8, taken in an axial direction thereof. FIG. 6 shows regulating device 8 coupled with sensor housing 70 to which steering shaft 2 and sensor 4 are assembled, taken in the axial direction thereof. Regulating device 8 includes electric wiring 9 connected to sensor substrate 42 (i.e., the resistor of neutral point regulating circuit 44), and a construction (jig structure) similar to that of gear housing 71 of apparatus 1. Specifically, regulating device 8 includes opening 81, mating surface 82, seal groove 83, fitting recess 84, bearing holder portion 85 (larger diameter hole 86, smaller diameter hole 87), output shaft accommodating hole 88 and bearing holder portion 89 which correspond to second opening 711, mating surface 712, seal groove 713, fitting recess 714, third bearing holder portion 715 (larger diameter hole 716, smaller diameter hole 717), output shaft accommodating hole 718 and fourth bearing holder portion 719 of gear housing 71, respectively. Similar to gear housing 71, ball bearing 63 is disposed on bearing holder portion 85. Regulating device 8 includes seating (or pedestal) 80 which is to be set on a working floor. Seating 80 is formed into a stepped convex cylindrical shape in cross section taken along a central axis thereof. Regulating device 8 is set on the working floor such that opening 81 is directed upwardly in a vertical direction.

Regulating device 8 serves as a jig for regulating sensor 4 in a state of apparatus 1 similar to a finished product, that is, in such a state that sensor housing 70 is assembled to gear housing 71. That is, when regulating the neutral point of steering shaft 2, sensor housing 70 to which steering shaft 2 and sensor 4 are assembled is mounted to regulating device 8 in the same manner as upon being assembled to gear housing 71. Specifically, sensor housing 70 and regulating device 8 are arranged such that opening 701 and opening 81 are opposed to each other in the direction of axis X, and then connected to each other by engaging fitting projection 707 in fitting recess 84. At this time, output shaft 21 of steering shaft 2 is received in regulating device 8 (output shaft accommodating hole 88), and rotatably supported at both ends thereof by ball bearing 63 at bearing holder portion 85 and by needle bearing 64 at bearing holder portion 89. In this state, surface 422 of sensor substrate 42 on the side of the negative direction of axis X is exposed to first opening 701 of sensor housing 70. In other words, surface 422 is exposed to opening 81 of regulating device 8.

As shown in FIG. 6, connection point 441 of sensor substrate 42 is disposed to be radially outwardly spaced from outer race 631 of ball bearing 63 (that is, in a position spaced apart from a central axis of steering shaft 2). Electric wiring 9 has one end portion extending inside of regulating device 8 in the direction of axis X and disposed in alignment with connection point 441 when viewed in the direction of axis X. Specifically, the one end portion of electric wiring 9 extends in the direction of axis X through a portion radially outwardly spaced from outer race 631 of ball bearing 63, that is, through bearing holder portion 85 and projects from a portion of a bottom surface of fitting recess 84 which is located radially outwardly spaced from retainer 632. The projecting tip end of the one end portion of electric wiring 9 has terminal 90 for regulation of sensor 4 which is connected with connection point 441. Terminal 90 is disposed in a position aligned with connection point 441 when viewed in the direction of axis X (i.e., in substantially the same radial position as connection point 441 with respect to the central axis of apparatus 1). In the mounting state shown in FIG. 6, terminal 90 extends from the side of the bottom surface of fitting recess 84 in the positive direction of axis X and is connected with connection point 441. Terminal 90 includes a biasing member, specifically, a coil spring as an elastic member, and is biased toward connection point 441 in the direction of axis X by the coil spring. The other end portion of electric wiring 9 extends from an inside of regulating device 8 in a radial direction of regulating device 8 and projects from a side surface of regulating device 8. The other end portion of electric wiring 9 is then connected to the side of an operator for regulating the neutral point, for instance, to a personal computer as an input device set near the operator. When an impedance value (or a voltage value corresponding to the impedance value) is inputted by the operator, an electric signal (voltage) corresponding to the impedance value is applied to the resistor of neutral point regulating circuit 44 through electric wiring 9 so that the resistance value (the impedance value) can be variably regulated to a desired value. That is, regulating device 8 is an electronic regulator which electronically regulates the resistance value (the impedance value).

[Method of Regulating Neutral Point of Sensor]

A method of regulating an impedance value in sensor coil 40 at a neutral point of steering shaft 2 (hereinafter referred to as a method of regulating a neutral point of sensor 4) of apparatus 1 includes first to a third steps. The first step is a preparation step before regulating the neutral point. In the first step, a unit is formed by assembling steering shaft 2 and sensor 4 (i.e., respective parts such as sensor substrate 42) to sensor housing 70, and the unit is mounted onto regulating device 8 serving as a jig (see FIG. 6). This unit includes output shaft 21 connected to input shaft 20 through torsion bar 22, and sensor coil 40 and magnetic path resistance varying member 41 which are assembled to steering shaft 2. Upon mounting the unit on regulating device 8, electric wiring 9 of regulating device 8 is connected with neutral point regulating circuit 44 (i.e., connection point 441) of the unit. The second step is a step of regulating a resistance value of the resistor of neutral point regulating circuit 44 using regulating device 8 as the electronic regulator, after completion of the first step. That is, in the second step, the resistance value of the resistor is regulated by regulating device 8 so as to regulate an impedance value in sensor coil 40 which varies in accordance with a change in amount of relative rotation of input shaft 20 and output shaft 21. In the mounting state as shown in FIG. 6 in which the unit is coupled with regulating device 8, an impedance value in sensor coil 40 in a steering neutral state (that is, in a state where an amount of clockwise and counterclockwise rotation of steering shaft 2 is zero) is detected and regulated. Meanwhile, it is not necessarily required to detect and regulate the impedance value in sensor coil 40 in the steering neutral state. An average of the amount of clockwise and counterclockwise rotation of steering shaft 2 may be detected and regulated. The third step is a step of assembling apparatus 1 after completion of the second step of regulating the impedance value in sensor coil 40 at the neutral point. In the third step, the unit is detached from regulating device 8 and is connected with gear housing 71 so as to close first opening 701.

Functions of First Embodiment

Functions of apparatus 1 according to the first embodiment will be explained hereinafter.
(Simplification of Apparatus)

The power steering apparatus of Japanese Patent Application Unexamined Publication No. 2009-298246 includes a control substrate connected to a sensor which detects a steering operation state. The control substrate is assembled not to a connecting portion of the sensor housing and a gear housing in an axial direction thereof but to the sensor housing through an opening formed to be open to an outer circumferential surface of the sensor housing (that is, to a radial side surface of the sensor housing). Therefore, an operation of regulating the sensor can be carried out through the opening. However, the opening must be closed by a lid or the like. Further, in a case where the power steering apparatus necessitates a waterproof structure, the lid also must have a waterproof property, leading to a complicated construction of the apparatus. Thus, this conventional art has the problem as described above. In contrast, in apparatus 1 according to the first embodiment, sensor substrate 42 on which neutral point regulating circuit 44 is disposed is arranged to be exposed to first opening 701 of sensor housing 70 which is disposed to be opposed to second opening 711 of gear housing 71. With this arrangement, the operation of regulating the impedance value in sensor coil 40 at the neutral point (hereinafter referred to as the neutral point regulating operation) can be carried out through the first opening 701. That is, before sensor housing 70 is connected to gear housing 71, the neutral point regulating operation can be performed through first opening 701 of sensor housing 70. First opening 701 is closed by connecting sensor housing 70 with gear housing 71, and therefore, it is not necessary to form an additional opening in steering housing 7 (sensor housing 70) in order to carry out the neutral point regulating operation. As a result, the structure of apparatus 1 can be simplified. In addition, sensor 4 is not limited to the torque sensor used in the first embodiment and a steering angle sensor may be used as sensor 4. In such a case, the same functions as described above can also be attained.

Further, upon producing apparatus 1, a unit is formed by assembling steering shaft 2 and sensor 4 (the components such as sensor substrate 42) to sensor housing 70, and the neutral point regulating operation can be carried out through opening 701 of the unit before connecting the unit to gear housing 71. Thus, the neutral point regulating operation is carried out through opening 701 of the unit in the production process, and after finishing the regulating operation, the unit is assembled to gear housing 71 so that apparatus 1 as a final product can be provided. Accordingly, the number of steps of producing apparatus 1 can be reduced. Meanwhile, when carrying out the neutral point regulating operation again in apparatus 1 as the final product, gear housing 71 is taken off from apparatus 1, and in this state, the neutral point regulating operation can be carried out through opening 701 of sensor housing 70.

(Enhancement of Regulation Accuracy)

In apparatus 1 according to the first embodiment, since the neutral point regulating operation is carried out through opening 701 of the unit formed in the step of producing apparatus 1, a regulation accuracy can be enhanced. For instance, in this embodiment, in the substantially same state as actually used in apparatus 1 in which sensor coil 40 and magnetic path resistance varying member 41 are assembled to sensor housing 70, the neutral point regulating operation is carried out to regulate the resistance value of neutral point regulating circuit 44 so as to regulate the impedance value in sensor coil 40. As a result, it is possible to regulate the resistance value in accordance with characteristics of the actually used parts and therefore enhance a regulation accuracy. Further, in this embodiment, in the substantially same state as actually used in apparatus 1 in which torsion bar 22 and output shaft 21 are assembled to sensor housing 70, the neutral point regulating operation is carried out to regulate the resistance value. Therefore, the regulation accuracy can be enhanced. Specifically, steering torque is equivalent to a product of an amount of the relative rotation of input shaft 20 and output shaft 21 and a spring constant of torsion bar 22. The spring constant of torsion bar 22 is finely varied depending on an individual difference between the torsion bars themselves as parts and the assembled state of torsion bar 22 relative to input shaft 20 and output shaft 21. If the spring constant is varied, there will occur a change in the relationship between an amount of the relative rotation of input shaft 20 and output shaft 21 and steering torque. Accordingly, it is preferred to regulate the resistance value of the resistor of neutral point regulating circuit 44 on the basis of the spring constant of torsion bar 22 as an actual part. In the first embodiment, since the neutral point regulating operation is carried out in the substantially same state as actually used in apparatus 1 in which torsion bar 22, input shaft 20 and output shaft 21 are assembled to sensor housing 70, the resistance value can be regulated so as to more faithfully reflect characteristics of the actual parts so that the regulation accuracy can be enhanced.

In apparatus 1 according to the first embodiment, the resistance value of the resistor of neutral point regulating circuit 44 is electronically and automatically regulated by using external regulating device 8. However, the regulation of the resistance value may be manually carried out without using regulating device 8. For instance, the regulation of the resistance value is carried out by manually moving a movable terminal (knob) of the resistor. In the first embodiment, since the resistance value is electronically regulated by using external regulating device 8 as an electronic regulator, a regulation accuracy and a reliability of sensor 4 can be enhanced. Further, the neutral point regulating operation can be automatically carried out by remote control, so that the number of steps of the operation can be reduced to thereby enhance an operating efficiency. Further, regulating device 8 as a jig has a construction similar to that of gear housing 71 (i.e., bearing holder portion 85, ball bearing 63 and the like), and the neutral point regulating operation is carried out in the same state as used in apparatus 1 as a final product. Therefore, the resistance value of the resistor of neutral point regulating circuit 44 can be regulated to more faithfully reflect characteristics of apparatus 1 as an actual product, thereby enhancing a regulation accuracy. Thus, the neutral point regulating operation can be efficiently carried out with high accuracy only by setting the unit of sensor housing 71 assembled in the production process on regulating device 8. Further, apparatus 1 can be completed by assembling the unit of sensor housing 71 to gear housing 71 after the neutral point regulating operation is finished. Accordingly, apparatus 1 can be produced by the considerably reduced number of steps.

Sensor substrate 42 may be disposed in a slightly inclined state relative to a plane perpendicular to steering shaft 2. In the first embodiment, sensor substrate 42 is arranged to form a substantially right angle between sensor substrate 42 and steering shaft 2. With this arrangement of sensor substrate 42, an axial length (i.e., a dimension in the direction of axis X in which steering shaft 2 extends) of steering housing 7 can be reduced. In addition, the shape of sensor substrate 42 is not limited to an annular (doughnut) shape in the first embodiment and may be other shapes, for instance, a generally annular (doughnut) shape having a partly cutout in a circumferential direction thereof. In the first embodiment, sensor substrate 42 is formed into the annular (doughnut) shape having through-hole 420 through which steering shaft 2 extends. With this configuration, it is possible to not only reduce a dimension of apparatus 1 in a radial direction of steering shaft 2 (i.e., in a direction substantially perpendicular to steering shaft 2) but also ensure a mounting area to which sensor substrate 42 is mounted. That is, since sensor substrate 42 is formed into the annular (doughnut) shape having no cutout in a whole area in the circumferential direction, a necessary area of sensor substrate 42 (i.e., a region of sensor substrate 42 which is necessary to mount an electronic device) can be ensured even in a case where the radial dimension of sensor substrate 42 is reduced. Further, since sensor substrate 42 has a circular ring shape, it is possible to not only save a space but also ensure the mounting area, as compared to a case where sensor substrate 42 has a rectangular shape.

(Advantages in Connection Operation)

In apparatus 1 according to the first embodiment, sensor substrate 42 is arranged to form a substantially right angle between sensor substrate 42 and steering shaft 2, and connection point 441 of neutral point regulating circuit 44 is disposed on surface 422 of sensor substrate 42 which is located on the side of the negative direction of axis X. With this arrangement, connection point 441 is exposed to the side of output shaft 21 (i.e., the side of first opening 701) so that an operation of connecting the connection point 441 with external regulating device 8 can be more facilitated. For instance, if terminal 90 of regulating device 8 is disposed in the position where terminal 90 is in alignment with connection point 441 when viewed in the direction of axis X (that is, in the same radial position as that of connection point 441 with respect to the central axis of apparatus 1), terminal 90 can be opposed to connection point 441 while engaging fitting projection 707 of sensor housing 70 in fitting recess 84 of regulating device 8, when sensor housing 70 is set on regulating device 8 from the side of the positive direction of axis X. Accordingly, an operation of connecting terminal 90 with connection point 441 can be facilitated. Meanwhile, connection point 441 can be disposed on surface 421 of sensor substrate 42 on the side of the positive direction of axis X (i.e., on the side of input shaft 20). In such a case, it is also possible to carry out the neutral point regulating operation by connecting regulating device 8 with connection point 441 through first opening 701. Furthermore, connection point 441 is not necessarily disposed on sensor substrate 42 as long as connection point 441 is exposed to the side of output shaft 21. For instance, as explained later in a fourth embodiment, connection point 441 can be disposed on an end surface of substrate holder portion 704 (fitting projection 707) of sensor housing 70 which is located on the side of the negative direction of axis X. Since in the first embodiment, connection point 441 is disposed on sensor surface 42, an increase in radial dimension of substrate holder portion 704 (fitting projection 707) of sensor housing 70 can be suppressed to thereby reduce a radial dimension of apparatus 1, as compared to the fourth embodiment.

In apparatus 1 according to the first embodiment, connection point 441 of neutral point regulating circuit 44 is disposed on surface 422 of sensor substrate 42 on the side of the negative direction of axis X, and terminal 90 of regulating device 8 is biased toward connection point 441. With this construction, an operation of connecting regulating device 8 and connection point 441 to each other can be more facilitated. Specifically, when sensor housing 70 is set on regulating device 8 from the side of the positive direction of axis X so as to engage fitting projection 707 of sensor housing 70 in fitting recess 84 of regulating device 8, terminal 90 is brought into contact with connection point 441 and compressed thereby. Thus, since terminal 90 is urged to be in press-contact with connection point 441 by the biasing force of the biasing member, regulating device 8 and connection point 441 can be connected with each other so as to allow electrical connection therebetween by only setting sensor housing 70 on regulating device 8. Therefore, an operation of electrically connecting regulating device 8 and connection point 441 becomes unnecessary to thereby save time and effort in the connecting operation. Further, even when terminal 90 is displaced relative to connection point 441 in the radial direction or in the axial direction, terminal 90 constituted of the elastic member (i.e., the coil spring) can be elastically deformed to absorb the displacement and further ensure the connection with connection point 441.

In apparatus 1, ball bearing (third bearing) 63 is disposed between rack-and-pinion mechanism 3 and sensor substrate 42. With this arrangement, even when a lubricant (grease, etc.) in rack-and-pinion mechanism 3 is splashed, ball bearing 63 can act as a barrier to prevent the lubricant from entering the side of sensor substrate 42. Therefore, it is possible to suppress occurrence of such a problem that the lubricant enters the side of sensor substrate 42 from the negative direction of axis X and adheres to sensor substrate 42 to thereby cause adverse influence on the function of sensor 4. Further, connection point 441 is disposed to be radially outwardly spaced from ball bearing 63. With this arrangement, even when the resistance value of the resistor is regulated by external regulating device 8 in the assembled state in which output shaft 21 and ball bearing 63 are assembled to sensor housing 70, regulating device 8 and connection point 441 can be connected to each other without interfering with ball bearing 63. That is, as shown in FIG. 6, since electric wiring 9 of regulating device 8 is arranged without extending through the radial inside of ball bearing 63, the operation of connecting regulating device 8 with connection point 441 can be more readily carried out.

(Advantages in Molding)

In apparatus 1, sensor housing 70 is made of a resin material to thereby serve for enhancing productivity of sensor housing 70 and reducing a weight of apparatus 1 and a cost thereof. Further, since connector mounting portion 708 (connector 43*c*) is molded integrally with sensor housing 70, the number of parts and the number of steps of assembling can be reduced, and it is not necessary to provide a waterproof structure between sensor housing 70 and connector mounting portion 708 (connector 43*c*). Further, since electric wiring 43*b* which connects sensor substrate 42 and connector 43*c* is formed integrally with sensor housing 70 by insert-molding, it is not necessary to provide an additional waterproof structure. As a result, it is possible to simplify the construction of apparatus 1 and enhance the productivity thereof. In the first embodiment, gear housing 71 is made of a metal material and formed with third bearing holder portion 715 (smaller diameter hole 717) for ball bearing 63 (third bearing). On the other hand, sensor housing 70 is made of a resin material and is formed with no bearing holder portion for ball bearing 63. In other words, ball bearing 63 is supported not by sensor housing 70 made of the resin material but by gear housing 71 made of the metal material. Accordingly, it is possible to readily ensure a strength necessary for bearing holder portion 715 (smaller diameter hole 717) for ball bearing 63. In addition, it is possible to suppress complication of the structure of sensor housing 70, enhance the moldability thereof and suppress increase in dimension of sensor housing 70.

Effects of First Embodiment

The first embodiment of the present invention can attain the following effects.

(1) Apparatus 1 includes steering shaft 2 to which a rotational force is to be transmitted from a steering wheel, sensor coil 40 which is disposed on an outer circumferential side of steering shaft 2 and detects a change in impedance value to determine an amount of rotation of steering shaft 2, steering housing 7 including a first housing (sensor housing 70) surrounding sensor coil 40 and a second housing (gear housing 71) connected with the first housing, the first housing and the second housing being connected with each other in such a state that first opening 701 formed in the first housing and second opening 711 formed in the second housing are opposed to each other, steering housing 7 accommodating steering shaft 2 so as to extend through first opening 701 and second opening 711, sensor substrate 42 disposed on the first housing and arranged closer to first opening 701 than sensor coil 40 so as to be exposed to first opening 701, neutral point regulating circuit 44 which is disposed on sensor substrate 42 and includes a resistor connected to sensor coil 40, neutral point regulating circuit 44 being capable of variably regulating a resistance value so as to regulate the impedance value at a neutral point at which an amount of clockwise and counterclockwise rotation of steering shaft 2 is zero, and electric motor 5 which is driven and controlled in accordance with an output signal of sensor coil 40 which is regulated by neutral point regulating circuit 44 to provide steerable road wheels with a steering assist force. In apparatus 1, since sensor substrate 42 with neutral point regulating circuit 44 is arranged to be exposed to first opening 701, the neutral point regulating operation can be carried out through first opening 701. Further, since first opening 701 is not closed before connecting first housing 70 and second housing 71, it is not necessary to form an additional opening for carrying out the neutral point regulating operation in steering housing 7. As a result, the construction of apparatus 1 can be simplified while enabling regulation of the impedance value in sensor coil 40 at the neutral point.

(1-1) In apparatus 1, steering shaft 2 includes input shaft 20 to which a rotational force is to be transmitted from the steering wheel, and output shaft 21 which is connected to input shaft 20 through torsion bar 22 and adapted to transmit the rotational force to steerable road wheels. Sensor coil 40 detects a change in impedance value to determine an amount of relative rotation of input shaft 20 and output shaft 21. Neutral point regulating circuit 44 is capable of variably regulates a resistance value of the resistor so as to regulate the impedance value at a neutral point at which the amount of relative rotation of input shaft 20 and output shaft 21 is zero. In a case where sensor 4 is a torque sensor as described above which detects the change in impedance value in sensor coil 40 to determine an amount of relative rotation of input shaft 20 and output shaft 21, the same effects as described in the above (1) can be obtained.

(2) Apparatus 1 further includes magnetic path resistance varying member 41 which is disposed on steering shaft 2 and configured to vary a magnetic path resistance in the magnetic field which is generated by sensor coil 40 in accordance with a change in amount of relative rotation of input shaft 20 and output shaft 21. Sensor coil 40 detects the change in impedance value which varies in accordance with a variation in magnetic path resistance to determine the amount of relative rotation of input shaft 20 and output shaft 21. The resistance value of the resistor of neutral point regulating circuit 44 is regulated in a state in which sensor coil 40 and magnetic path resistance varying member 41 are assembled to the first housing (sensor housing 70). Since the resistance value is regulated so as to regulate the impedance value in the substantially same state as actually used in apparatus 1 in which sensor coil 40 and magnetic path resistance varying member 41 are assembled to sensor housing 70, it is possible to carry out the regulating operation in accordance with characteristics of the actually used parts, and therefore, enhance a regulation accuracy.

(3) Neutral point regulating circuit 44 regulates the resistance value of the resistor so as to regulate the impedance value which varies in accordance with a change in amount of relative rotation of input shaft 20 and output shaft 21 in a state in which output shaft 21 is assembled to input shaft 20 through torsion bar 22. Since in the substantially same state as actually used in apparatus 1 in which torsion bar 22 and output shaft 21 are assembled to sensor housing 70, it is possible to carry out the regulating operation so as to more faithfully reflect characteristics of the actually used parts, and therefore, enhance a regulation accuracy.

(4) Apparatus 1 further includes the reduction gear (rack-and-pinion mechanism 3) which is disposed between output shaft 21 and electric motor 5 and transmits a rotational force of electric motor 5 to output shaft 21, and a bearing (ball bearing 63) which is disposed between sensor substrate 42 and the reduction gear and supports output shaft 21 to be rotatable relative to steering housing 7. With this arrangement of ball bearing 63 between sensor substrate 42 and the reduction gear, it is possible to prevent a lubricant in the reduction gear from entering the side of sensor substrate 42 and thereby suppress deterioration in function of sensor 4.

(5) In apparatus 1, the first housing (sensor housing 70) is made of a resin material, the second housing (gear housing 71) is made of a metal material, and the bearing (ball bearing 63) is held on bearing holder portion 715 formed in the second housing and supports output shaft 21 so as to be rotatable relative to steering housing 7. With this arrangement, it is possible to ensure a necessary strength of bearing holder portion 715 for ball bearing 63 and enhance the moldability of the first housing. As a result, it is possible to ensure a necessary strength of steering housing 7 and enhance the productivity.

(6) In apparatus 1, neutral point regulating circuit 44 includes connection point 441 to be connected with external regulating device 8 which regulates the resistance value of the resistor. Connection point 441 is disposed to be radially outwardly spaced from the bearing (ball bearing 63). With this arrangement, in a case where the resistance value of the resistor is regulated by external regulating device 8 in a state in which output shaft 21 and ball bearing 63 are assembled to external regulating device 8, external regulating device 8 and connection point 441 can be connected with each other without interfering with ball bearing 63. As a result, it is possible to enhance a regulation accuracy and facilitate the operation of connecting external regulating device 8 and connection point 441 with each other.

(7) In apparatus 1, sensor substrate 42 is arranged to form a right angle between sensor substrate 42 and steering shaft 2. With this arrangement, an axial length of steering housing 7 can be reduced, and therefore, apparatus 1 can be downsized.

(8) In apparatus 1, neutral point regulating circuit 44 includes connection point 441 to be connected with external regulating device 8 which regulates the resistance value of the resistor. Connection point 44 is disposed on surface 422 of sensor substrate 42 which is located on the side of output shaft 21. With this arrangement, connection point 441 is exposed to the side of output shaft 21 so that the operation of connecting external regulating device 8 and connection point 441 to each other can be facilitated.

(9) In apparatus 1, a portion (terminal 90) of external regulating device 8 which is connected with connection point 441 of neutral point regulating circuit 44 is biased toward connection point 441 in an axial direction of steering shaft 2. With this construction, an operation of connecting regulating device 8 and connection point 441 to each other can be facilitated.

(10) In apparatus 1, the first housing (sensor housing 70) is made of a resin material. With this construction, it is possible to reduce a weight of apparatus 1 and enhance productivity of the first housing.

(11) Apparatus 1 includes connector mounting portion 708 (connector 43c) which is molded simultaneously and integrally with the first housing (sensor housing 70), connector 43c which is disposed on connector mounting portion 708 and serves as a connection terminal to be connected with external electronic devices (i.e., ECU, battery) to be mounted to an automobile, and electric wiring 43b which connects sensor substrate 42 and connector 43c with each other. Since connector mounting portion 708 is molded integrally with the first housing, it is not necessary to provide a waterproof structure between the first housing and connector mounting portion 708. As a result, it is possible to simplify the construction of apparatus 1 and enhance the productivity thereof.

(12) In apparatus 1, sensor substrate 42 is formed into an annular shape having through-hole 420 through which steering shaft 2 extends. With this construction, it is possible to reduce a dimension of apparatus 1 in a radial direction of steering shaft 2 and ensure an mounting area in which sensor substrate 42 is mounted.

(13) There is provided a method of regulating a neutral point of torque sensor 4 in apparatus 1, apparatus 1 including steering shaft 2 including input shaft 20 to which a rotational force is to be transmitted from the steering wheel, and output shaft 21 which is connected to input shaft 20 through torsion bar 22 and adapted to transmit the rotational force to steerable road wheels, sensor coil 40 which is disposed on an outer circumferential side of steering shaft 2 and detects a change in impedance value to determine an amount of relative rotation of input shaft 20 and output shaft 21, steering housing 7 including a first housing (sensor housing 70) surrounding sensor coil 40 and a second housing (gear housing 71) connected with the first housing, the first housing and the second housing being connected with each other in such a state that first opening 701 formed in the first housing and second opening 711 formed in the second housing are opposed to each other, steering housing 7 accommodating steering shaft 2 so as to extend through first opening 701 and second opening 711, sensor substrate 42 disposed on the first housing and arranged closer to first opening 701 than sensor coil 40 so as to be exposed to first opening 701, neutral point regulating circuit 44 which is disposed on sensor substrate 42 and includes a resistor connected to sensor coil 40, and electric motor 5 which is driven and controlled to provide the steerable road wheels with a steering assist force in accordance with an output signal of sensor coil 40 which is regulated by neutral point regulating circuit 44. The method includes a first step of connecting regulating device 8 which regulates a resistance value of the resistor with neutral point regulating circuit 44 in a state in which first opening 701 is not closed by the second housing, a second step of regulating the resistance value of the resistor by regulating device 8, and a third step of connecting the first housing and the second housing with each other so as to close first opening 701. Since sensor substrate 42 is exposed to first opening 701, the neutral point regulating operation can be carried out through first opening 701. Further, since first opening 701 is not closed before connecting first housing 70 and second housing 71 with each other, it is not necessary to form an additional opening for the neutral point regulating operation in steering housing 7. As a result, the construction of apparatus 1 can be simplified.

(14) Apparatus 1 further includes magnetic path resistance varying member 41 which is disposed on steering shaft 2 and configured to vary a magnetic path resistance in the magnetic field which is generated by sensor coil 40 in accordance with a change in amount of relative rotation of input shaft 20 and output shaft 21. Sensor coil 40 detects the change in impedance value which varies in accordance with a variation in magnetic path resistance to determine the amount of relative rotation of input shaft 20 and output shaft 21. The first step and the second step are carried out in a state in which magnetic path resistance varying member 41 is assembled to steering shaft 2. Since the resistance value is regulated so as to regulate the impedance value in the substantially same state as actually used in the power steering apparatus in which sensor coil 40 and magnetic path resistance varying member 41 are assembled to sensor housing 70, the regulating operation can be carried out in accordance with characteristics of the actually used parts and, therefore, a regulation accuracy can be enhanced.

(15) The first step and the second step are carried out so as to regulate the impedance value which varies in accordance with a change in amount of relative rotation of input shaft 20 and output shaft 21 in a state in which output shaft 21 is connected to input shaft 20 through torsion bar 22. Since the regulating operation is carried out in the substantially same state as actually used in apparatus 1 in which torsion bar 22 and output shaft 21 are assembled to input shaft 20, the regulating operation can be performed reflecting characteristics of the actually used parts, and therefore, the regulation accuracy can be enhanced.

(16) Neutral point regulating circuit 44 includes connection point 441 to be connected with regulating device 8. Regulating device 8 includes a portion (terminal 90) to be connected with connection point 441. The portion (terminal 90) is biased toward connection point 441 in an axial direction of steering shaft 2. With this construction, an operation of connecting external regulating device 8 and connection point 441 with each other can be facilitated.

Second Embodiment

Figure 7:
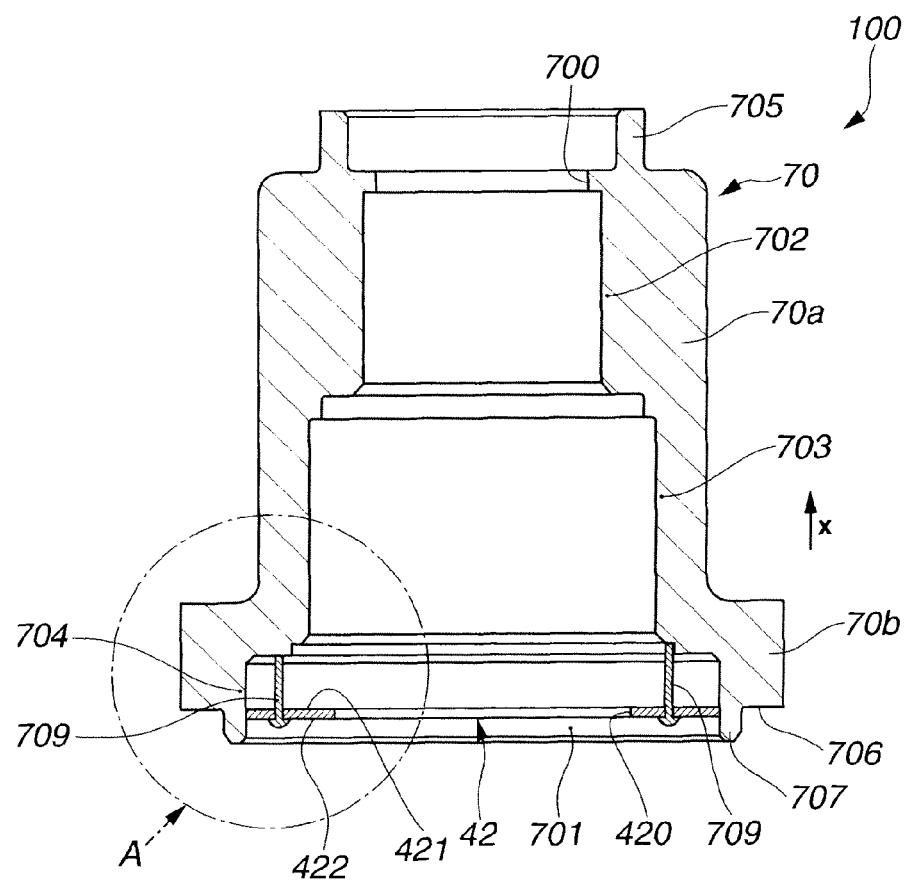
FIG. 7 is a cross section, taken along line II-II as shown in FIG. 9, of the sensor housing of the power steering apparatus according to a second embodiment to which a sensor substrate is assembled.
Figure 8:
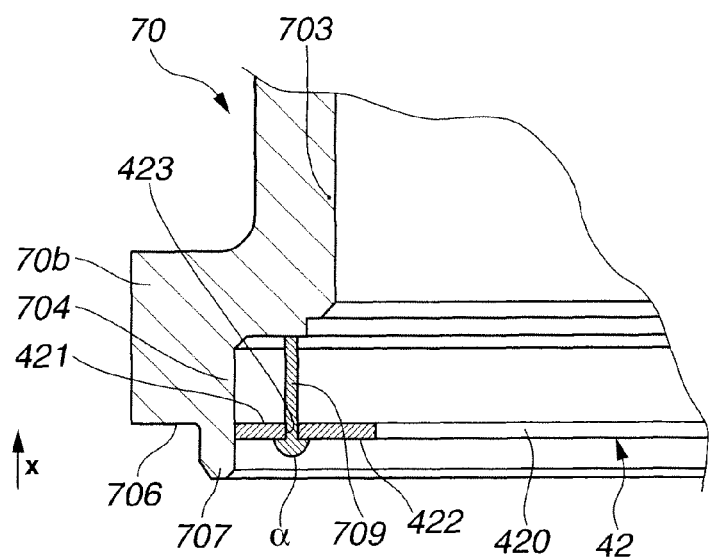
FIG. 8 is an enlarged view of circled part A as shown in FIG. 7.
Figure 9:
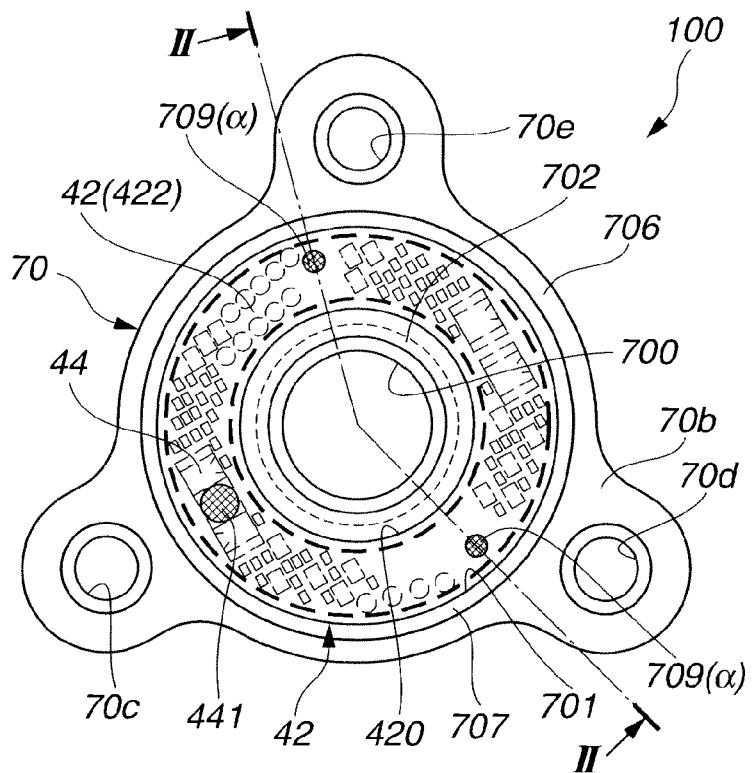
FIG. 9 is a plan view of the sensor housing of the power steering apparatus according to the second embodiment to which the sensor substrate is assembled, when viewed from the side of an opening of the sensor housing.

Referring to FIG. 7 to FIG. 9, the power steering apparatus according to a second embodiment of the present invention is explained. The second embodiment differs from the first embodiment in that sensor substrate 42 is fixed to sensor housing 70 by so-called thermal caulking. Like reference numerals denote like parts, and therefore, detailed explanations therefor are omitted. FIG. 7 is a cross section, taken along a plane on which the central axis of sensor housing 70 having sensor substrate 42 according to the second embodiment exists. FIG. 8 is an enlarged view of a circled part A as shown in FIG. 7. FIG. 9 is a view of sensor housing 70 having sensor substrate 42 according to the second embodiment, when viewed from the side of the negative direction of axis X. FIG. 7 substantially corresponds to a cross section taken along line II-II as shown in FIG. 9.

As seen from FIG. 7 to FIG. 9, sensor substrate 42 is formed with two through-holes 423 extending through sensor substrate 42 in the direction of axis X. Through-holes 423 are arranged to be substantially symmetrical to each other with respect to a line which connects a center of through-hole 420 with connection point 441. Sensor housing 70 is made of a thermoplastic resin and includes two caulking fixing portions 709. As shown in FIG. 8, each of caulking fixing portions 709 is a pin-shaped projection which extends from a bottom surface of substrate holder portion 704 of connecting portions 70b which is located on the side of the positive direction of axis X, toward the negative direction of axis X. Caulking fixing portion 709 is made of a thermoplastic resin and formed integrally with sensor housing 70. Caulking fixing portion 709 is arranged in a position aligned with each of through-holes 423 of sensor substrate 42 (that is, in substantially the same radial position as that of through-hole 423) when viewed from the direction of axis X. Caulking fixing portion 709 extends through through-hole 423 from one side of through-hole 423 to the other side thereof and has tip end portion α projected from the other side of through-hole 423. Tip end portion α is subjected to thermal caulking to be melted and deformed to have an outer diameter larger than a diameter of through-hole 423, so that sensor substrate 42 is fixed to sensor housing 70 through caulking fixing portions 709. Specifically, the step of fixing sensor substrate 42 to sensor housing 70 includes a step of allowing respective caulking fixing portions 709 to extend through respective through-holes 423 from one side (i.e., the axis X positive direction side) of respective through-holes 423 to the other side (i.e., the axis X negative direction side) thereof such that a tip end portion α of respective caulking fixing portions 709 is projected from the other side of respective through-holes 423, a step of melting and deforming (thermally deforming) the projected tip end portion α such that the projected tip end portion α has an outer diameter larger than a diameter of respective through-holes 423, and a step of cooling and solidifying the tip end portion α thus melted and deformed. The step of fixing sensor substrate 42 to sensor housing 70 is carried out before the first step as described in the first embodiment. The remaining features of the second embodiment are the same as those of the first embodiment.

In the second embodiment, since sensor substrate 42 is fixed to sensor housing 70 by thermal caulking, a fixing member (such as a screw) as a separate part is not necessary so that the number of parts and a production cost of apparatus 100 can be reduced. Further, since caulking fixing portions 709 are formed integrally with sensor housing 70, caulking fixing portions 709 can be readily formed to thereby enhance the productivity of apparatus 100. Meanwhile, the number of caulking fixing portions 709 and the corresponding through-holes 423, the positions thereof and the shape thereof may be appropriately modified. Further, since caulking fixing portions 709 are allowed to extend through through-holes 423 of sensor substrate 42, respectively, positioning and fixing of sensor substrate 42 in the circumferential direction thereof with respect to sensor housing 70 can be carried out in the same step to thereby reduce the number of steps of producing apparatus 100.

Effects of Second Embodiment

(17) In apparatus 100 according to the second embodiment, sensor substrate 42 is formed with through-holes 423, and the first housing (i.e., sensor housing 70) is made of a thermoplastic resin and includes caulking fixing portions 709 for fixing sensor substrate 42 to the first housing. Respective caulking fixing portions 709 are made of the thermoplastic resin and integrally formed with the first housing. Respective caulking fixing portions 709 is allowed to extend through respective through-holes 423 from one side of respective through-holes 423 to the other side thereof. After respective caulking fixing portions 709 are allowed to extend through respective through-holes 423, tip end portion α of respective caulking fixing portions 709 which is projected from the other side of respective through-holes 423 is melted and deformed such that tip end portion α has an outer diameter larger than a diameter of respective through-holes 423 of sensor substrate 42. Subsequently, tip end portion α thus melted and deformed is cooled and solidified. Thus, sensor substrate 42 is fixed to the first housing through caulking fixing portions 709. With this construction, it is possible to reduce the number of parts and the production cost of apparatus 100 and enhance the productivity thereof.

(18) The method of regulating a neutral point of sensor 4 in apparatus 100 according to the second embodiment includes the same steps as described in the first embodiment, and further includes a step of fixing sensor substrate 42 to the first housing wherein the first housing is made of a thermoplastic resin and includes caulking fixing portions 709 made of the thermoplastic resin and formed integrally with the first housing, and sensor substrate 42 is formed with through-holes 423. The fixing step includes a step of allowing respective caulking fixing portions 709 to extend through respective through-holes 423 from one side of respective through-holes 423 to the other side thereof such that tip end portion α is projected from the other side of respective through-holes 423, a step of melting and deforming the projected tip end portion α such that the projected tip end portion α has an outer diameter larger than a diameter of respective through-holes 423, and a step of cooling and solidifying the melted and deformed tip end portion α. In this method, it is possible to reduce the number of parts and the production cost of apparatus 100 and enhance the productivity thereof.

Third Embodiment

Figure 10:
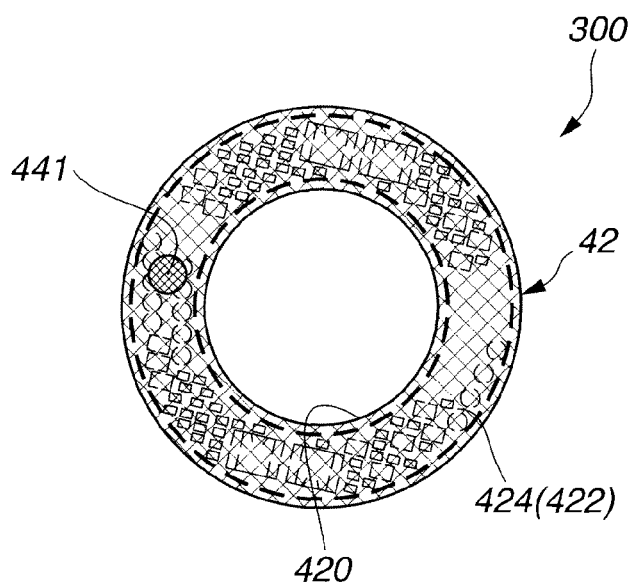
FIG. 10 is a plan view of a sensor substrate of the power steering apparatus according to a third embodiment.

Referring to FIG. 10, the power steering apparatus according to a third embodiment of the present invention is explained. The third embodiment differs from the first embodiment in that sensor substrate 42 includes coat 424. Like reference numerals denote like parts, and therefore, detailed explanations therefor are omitted. FIG. 10 is a plan view of sensor substrate 42 of apparatus 300 according to the third embodiment when viewed from the side of the negative direction of axis X (that is, from the side of surface 422 of sensor substrate 42 which is opposed to gear housing 71 and formed with connection point 441). As shown in FIG. 10, surface 422 of sensor substrate 42 except for a portion occupied by connection point 441 of neutral point regulating circuit 44 is covered with coat (film) 424 made of a non-conductive material. Specifically, surface 422 except for the portion occupied by connection point 441 is covered with coat 424 made of a resin material.

With this construction, when sensor housing 70 to which sensor substrate 42 and other parts are assembled is set on external regulating device 8, electronic devices except for connection point 441 which are disposed on sensor substrate 42 can be prevented from contacting with parts of external regulating device 8 or water. As a result, it is possible to suppress occurrence of adverse influence on the electronic devices. Further, even in a case where in apparatus 300 as a final product, a lubricant (grease etc.) in rack-and-pinion mechanism 3 enters from the side of gear housing 71 into sensor housing 70 and is adhered to surface 422 of sensor substrate 42, the electronic devices can be prevented from suffering from adverse influence thereon. Accordingly, a reliability of sensor 4 can be enhanced. Meanwhile, surface 422 to be covered with coat 424 is not limited to this embodiment, and any portion of surface 422 necessary to be covered may be covered with coat 424.

Effects of Third Embodiment

(19) In apparatus 300, neutral point regulating circuit 44 includes connection point 441 to be connected with external regulating device 8 which regulates the resistance value of the resistor. Connection point 441 is disposed on surface 422 of sensor substrate 42. Surface 422 except for a portion occupied by connection point 441 is covered with resin coat 424. With this construction, it is possible to enhance a reliability of sensor 4.

Fourth Embodiment

Figure 11:
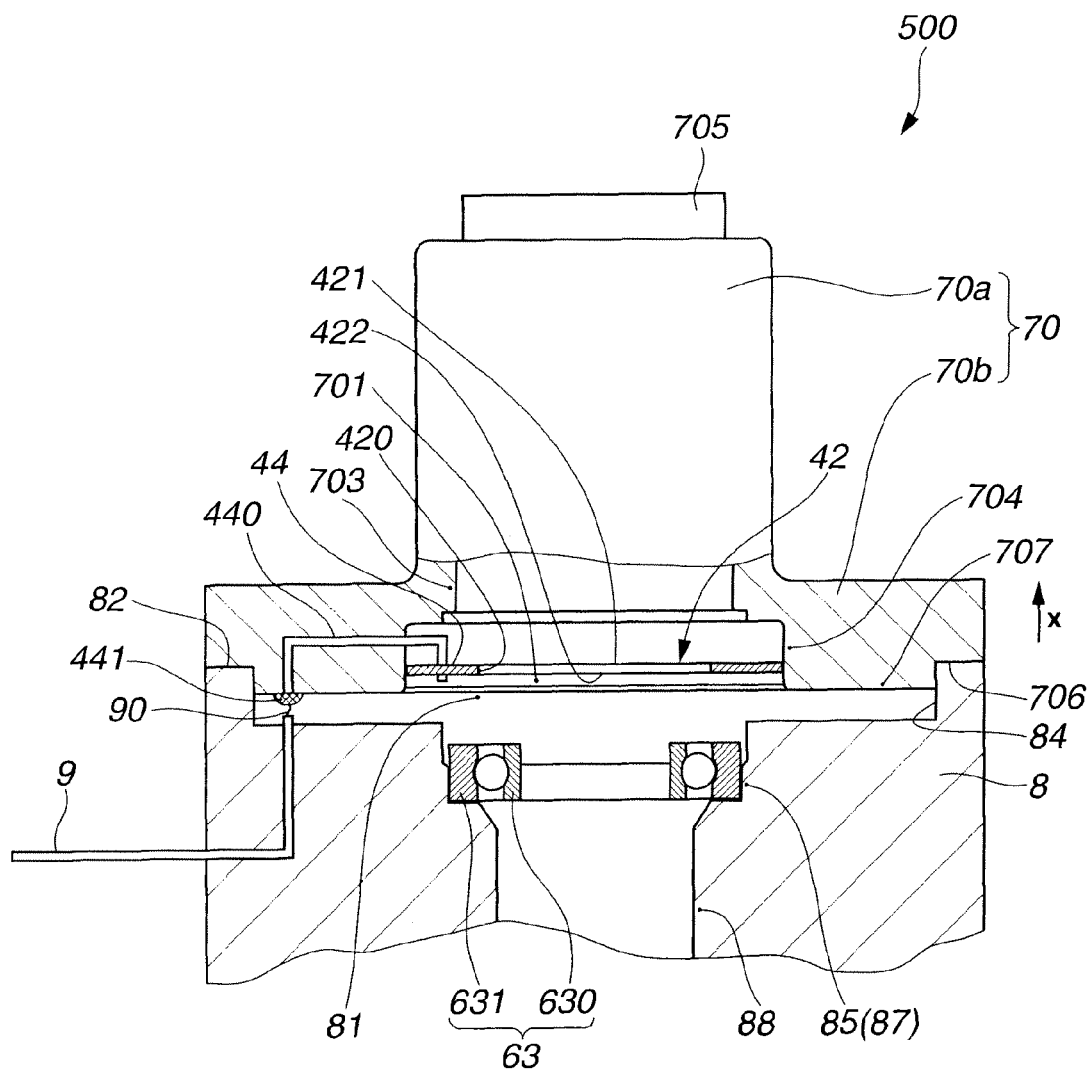
FIG. 11 is a cross section, partially broken away, of the sensor housing of the power steering apparatus according to a fourth embodiment which is set on the regulating device shown in FIG. 5.

Referring to FIG. 11, the power steering apparatus according to a fourth embodiment of the present invention is explained. The fourth embodiment differs from the first embodiment in that connection point 441 of neutral point regulating circuit 44 is disposed on an end surface of substrate holder portion 704 (i.e., on an end surface of fitting projection 707) which is located on the side of the negative direction of axis X (i.e., on the side of output shaft 21). Further, the fourth embodiment differs from the first embodiment in that retainer 632 for fixing outer race 631 of ball bearing 63 is omitted. Like reference numerals denote like parts, and therefore, detailed explanations therefor are omitted. FIG. 11 is an axial cross section of a part of sensor housing 70 of apparatus 500 according to the fourth embodiment which is set on regulating device 8. FIG. 11 shows the assembled state in which sensor substrate 42 is assembled to sensor housing 70. As shown in FIG. 11, fitting projection 707 of sensor housing 70 has a large diameter capable of providing connection point 441.

Neutral point regulating circuit 44 has terminal 440 for regulation. Connection point 441 to be connected with external regulating device 8 is disposed on terminal 440. Terminal 440 extends from surface 421 of sensor substrate 42 which is located on the side of the positive direction of axis X, in the positive direction of axis X and bends to extend in a radially outward direction of sensor substrate 42. Terminal 440 then enters into connecting portion 70b of sensor housing 70 and bends inside the connecting portion 70b, and further extends in the negative direction of axis X. Terminal 440 is then projected from an end surface of connecting portion 70b (i.e., the end surface of fitting projection 707) which is located on the side of the negative direction of axis X, in other words, from the end surface of substrate holder portion 704 which is located on the side of the negative direction of axis X. Specifically, terminal 440 is projected from a portion of the end surface of connecting portion 70b which is located radially outwardly spaced from ball bearing 63, and has a tip end which is exposed to fitting recess 84 of external regulating device 8. The tip end of terminal 440 is provided with connection point 441. Terminal 440 is formed simultaneously and integrally with sensor housing 70 by insert-molding. Terminal 90 of electric wiring 9 is arranged in external regulating device 8 so as to be in alignment with connection point 441 in the direction of axis X. Specifically, terminal 90 extends toward fitting recess 84 in the positive direction of axis X through regulating device 8 and is projected from a bottom surface of fitting recess 84 to contact with connection point 441. Similar to the first embodiment, terminal 90 is biased toward connection point 441 in the direction of axis X.

In apparatus 500, since connection point 441 is projected from the end surface of connecting portion 70b and exposed to the side of output shaft 21, an operation of connecting external regulating device 8 with connection point 441 can be further facilitated. In addition, since terminal 90 is biased toward connection point 441 and connection point 441 is disposed to be radially outwardly spaced from ball bearing 63, the operation of connecting regulating device 8 with connection point 441 can be further facilitated.

Effects of Fourth Embodiment

(20) In apparatus 500, neutral point regulating circuit 44 includes connection point 441 to be connected with external regulating device 8 which regulates the resistance value of the resistor. Connection point 441 is disposed on a surface of the first housing (sensor housing 70) which is opposed to second opening 711 of the second housing (gear housing 71). That is, connection point 441 is disposed on the end surface of substrate holder portion 704 which is located on the side of the negative direction of axis X. With this arrangement, an operation of connecting external regulating device 8 with connection point 441 can be facilitated.

(21) In apparatus 500, connection point 441 is disposed to be radially outwardly spaced from the bearing (ball bearing 63). With this arrangement, in a case where the resistance value of the resistor is regulated by external regulating device 8 in a state in which output shaft 21 and ball bearing 63 are assembled, external regulating device 8 and connection point 441 can be connected with each other without interfering with ball bearing 63. As a result, it is possible to enhance a regulation accuracy and facilitate the operation of connecting external regulating device 8 and connection point 441 with each other.

Other Embodiments

The present invention is not limited to the first to fourth embodiments as described above, and further modifications thereof may be made within the scope of the present invention. For instance, the first to fourth embodiments can be appropriately combined with each other.

The direct drive power steering apparatus is not limited to the rack assist type in the first to fourth embodiments, and may also be of a pinion assist type or column assist type in which electric motor 5 is mounted to output shaft 21 and driven to provide an assist force to rotation of output shaft 21. In such a case, a reduction gear (a reduction gear mechanism) is disposed between electric motor 5 and output shaft 21 in order to convert and increase the rotational force of electric motor 5 and then transmit the rotational force to output shaft 21. The reduction gear is accommodated in steering housing 7 (gear housing 71). In this case, ball bearing 63 which supports output shaft 21 so as to be rotatable relative to steering housing 7 is preferably disposed between sensor substrate 42 and the reduction gear. With this arrangement, ball bearing 63 can prevent a lubricant in the reduction gear from entering the side of sensor substrate 42.

This application is based on a prior Japanese Patent Application No. 2010-213083 filed on Sep. 24, 2010. The entire contents of the Japanese Patent Application No. 2010-213083 are hereby incorporated by reference.

Although the invention has been described above by reference to certain embodiments and modifications of the invention, the invention is not limited to the embodiment described above. Further modifications and variations of the embodiments and modifications described above will occur to those skilled in the art in light of the above teachings. The scope of the invention is defined with reference to the following claims.

What is claimed is:
1. A power steering apparatus comprising:
a steering shaft including an input shaft to which a rotational force is to be transmitted from a steering wheel, and an output shaft which is connected to the input shaft through a torsion bar and adapted to transmit the rotational force to steerable road wheels;
a sensor coil which is disposed on an outer circumferential side of the steering shaft and detects a change in impedance value to determine an amount of relative rotation of the input shaft and the output shaft;
a steering housing including a first housing surrounding the sensor coil and a second housing connected with the first housing, the first housing and the second housing being connected with each other in such a state that a first opening formed in the first housing and a second opening formed in the second housing are opposed to each other, the steering housing accommodating the steering shaft so as to extend through the first opening and the second opening,
a sensor substrate which is disposed on the first housing and arranged closer to the first opening than the sensor coil so as to be exposed to the first opening;
a neutral point regulating circuit which is disposed on the sensor substrate and includes a resistor connected to the sensor coil, the neutral point regulating circuit being capable of variably regulating a resistance value of the resistor so as to regulate the impedance value at a neutral point at which the amount of relative rotation of the input shaft and the output shaft is zero, and
an electric motor which is driven and controlled to provide the steerable road wheels with a steering assist force in accordance with an output signal of the sensor coil which is regulated by the neutral point regulating circuit.

2. The power steering apparatus as claimed in claim 1, further comprising a magnetic path resistance varying member which is disposed on the steering shaft and configured to vary a magnetic path resistance in the magnetic field which is generated by the sensor coil in accordance with a change in amount of relative rotation of the input shaft and the output shaft,
wherein the sensor coil detects the change in impedance value which varies in accordance with a variation in magnetic path resistance to determine the amount of relative rotation of the input shaft the output shaft, and
the neutral point regulating circuit regulates the resistance value of the resistor in a state in which the sensor coil and the magnetic path resistance varying member are assembled to the first housing.

3. The power steering apparatus as claimed in claim 2, wherein the neutral point regulating circuit regulates the resistance value of the resistor so as to regulate the impedance value which varies in accordance with a change in amount of relative rotation of the input shaft and the output shaft in a state in which the output shaft is assembled to the input shaft through the torsion bar.

4. The power steering apparatus as claimed in claim 1, further comprising a reduction gear which is disposed between the output shaft and the electric motor and transmits a rotational force of the electric motor to the output shaft, and a bearing which is disposed between the sensor substrate and the reduction gear and supports the output shaft so as to be rotatable relative to the steering housing.

5. The power steering apparatus as claimed in claim 4, wherein the first housing is made of a resin material, the second housing is made of a metal material, and the bearing is held on a bearing holder portion formed in the second housing and supports the output shaft so as to be rotatable.

6. The power steering apparatus as claimed in claim 5, wherein the neutral point regulating circuit includes a connection point to be connected with an external regulating device which regulates the resistance value of the resistor, and the connection point is disposed to be radially outwardly spaced from the bearing.

7. The power steering apparatus as claimed in claim 1, wherein the sensor substrate is arranged to form a right angle between the sensor substrate and the steering shaft.

8. The power steering apparatus as claimed in claim 7, wherein the neutral point regulating circuit includes a connection point to be connected with an external regulating device which regulates the resistance value of the resistor, and the connection point is disposed on a surface of the sensor substrate on a side of the output shaft.

9. The power steering apparatus as claimed in claim 8, wherein the external regulating device includes a portion to be connected with the connection point of the neutral point regulating circuit, the portion of the external regulating device being biased toward the connection point in an axial direction of the steering shaft.

10. The power steering apparatus as claimed in claim 1, wherein the first housing is made of a resin material.

11. The power steering apparatus as claimed in claim 10, further comprising:
a connector mounting portion molded simultaneously and integrally with the first housing,
a connector which is disposed on the connector mounting portion and serves as a connection terminal to be connected with external electronic devices to be mounted to an automobile, and
an electric wiring which connects the connector and the sensor substrate with each other.

12. The power steering apparatus as claimed in claim 10, wherein the sensor substrate is formed with at least one through-hole, and the first housing is made of a thermoplastic resin and includes at least one caulking fixing portion which is made of the thermoplastic resin and integrally formed with the first housing, the caulking fixing portion extending through the through-hole from one side of the through-hole to the other side of the through-hole to allow a tip end portion thereof to project from the other side of the through-hole, the tip end portion being melted and deformed such that the tip end portion has an outer diameter larger than a diameter of the through-hole and then cooled and solidified to thereby fix the sensor substrate to the first housing through the caulking fixing portion.

13. The power steering apparatus as claimed in claim 10, wherein the sensor substrate is formed into an annular shape having a through-hole through which the steering shaft extends.

14. The power steering apparatus as claimed in claim 1, wherein the neutral point regulating circuit includes a connection point to be connected with an external regulating device which regulates the resistance value of the resistor, the connection point is disposed on a surface of the sensor substrate, and the surface of the sensor substrate except for a portion occupied by the connection point is covered with a resin coat.

15. A power steering apparatus comprising:
a steering shaft to which a rotational force is to be transmitted from a steering wheel;
a sensor coil which is disposed on an outer circumferential side of the steering shaft and detects a change in impedance value to determine an amount of rotation of the steering shaft;
a steering housing including a first housing surrounding the sensor coil and a second housing connected with the first housing, the first housing and the second housing being connected with each other in such a state that a first opening formed in the first housing and a second opening formed in the second housing are opposed to each other, the steering housing accommodating the steering shaft so as to extend through the first opening and the second opening,
a sensor substrate which is disposed on the first housing and arranged closer to the first opening than the sensor coil so as to be exposed to the first opening;
a neutral point regulating circuit which is disposed on the sensor substrate and includes a resistor connected to the sensor coil, the neutral point regulating circuit being capable of variably regulating a resistance value of the resistor so as to regulate the impedance value at a neutral point at which an amount of clockwise and counter-clockwise rotation of the steering shaft is zero, and an electric motor which is driven and controlled to provide steerable road wheels with a steering assist force in accordance with an output signal of the sensor coil which is regulated by the neutral point regulating circuit.

* * * * *